United States Patent
Goparaju et al.

(10) Patent No.: US 9,315,615 B2
(45) Date of Patent: Apr. 19, 2016

(54) TITANIUM DIOXIDE PIGMENT AND MANUFACTURING METHOD

(71) Applicant: Tronox LLC, Oklahoma City, OK (US)

(72) Inventors: Venkata Rama Rao Goparaju, Edmond, OK (US); David Frank Marshall, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 342 days.

(21) Appl. No.: 13/840,520

(22) Filed: Mar. 15, 2013

(65) Prior Publication Data
US 2014/0275442 A1 Sep. 18, 2014

(51) Int. Cl.
| | | |
|---|---|---|
| *C09C 1/36* | (2006.01) | |
| *C09D 109/00* | (2006.01) | |
| *C08G 18/83* | (2006.01) | |
| *C08G 18/48* | (2006.01) | |
| *C08G 18/75* | (2006.01) | |
| *C08G 18/28* | (2006.01) | |
| *C08G 18/40* | (2006.01) | |
| *C08G 18/42* | (2006.01) | |
| *C08K 9/08* | (2006.01) | |
| *C08K 3/22* | (2006.01) | |

(52) U.S. Cl.
CPC ............. *C08G 18/83* (2013.01); *C08G 18/283* (2013.01); *C08G 18/4018* (2013.01); *C08G 18/4238* (2013.01); *C08G 18/4833* (2013.01); *C08G 18/755* (2013.01); *C08K 9/08* (2013.01); *C09C 1/3676* (2013.01); *C08K 2003/2241* (2013.01)

(58) Field of Classification Search
CPC ....... C01G 23/04; C08G 18/83; C09C 1/3607
See application file for complete search history.

(56) References Cited

U.S. PATENT DOCUMENTS

| | | | |
|---|---|---|---|
| 3,208,866 A | 9/1965 | Lewis et al. | |
| 3,512,219 A | 5/1970 | Stern et al. | |
| 3,804,810 A | 4/1974 | Fryd | |
| 3,856,929 A | 12/1974 | Angerman et al. | |
| 3,884,871 A * | 5/1975 | Herman et al. ............... 523/202 |

(Continued)

FOREIGN PATENT DOCUMENTS

| | | |
|---|---|---|
| EP | 2554609 A2 | 6/2013 |
| SG | 183521 A1 | 10/2012 |

(Continued)

OTHER PUBLICATIONS

International Search Report and Written Opinion dated Jun. 27, 2014 in PCT/US2014/22325, Tronox LLC.

(Continued)

*Primary Examiner* — Pegah Parvini
(74) *Attorney, Agent, or Firm* — McAfee & Taft

(57) ABSTRACT

In one aspect, the invention provides a titanium dioxide pigment. The titanium dioxide pigment comprises a plurality of titanium dioxide particles, and a polymer deposited on the titanium dioxide particles for inhibiting agglomeration of the titanium dioxide particles in an aqueous based coating formulation. The titanium dioxide particles have anchoring moieties associated therewith for facilitating anchoring of the polymer to the particles. The polymer is a copolymer having anchoring groups for attaching to the anchoring moieties associated with the titanium dioxide particles and hydrophobic end groups for attaching to the resin of the coating formulation. In another aspect, the invention provides a method of manufacturing a titanium dioxide pigment.

36 Claims, 3 Drawing Sheets

(56) References Cited

U.S. PATENT DOCUMENTS

| | | | |
|---|---|---|---|
| 3,923,968 A * | 12/1975 | Basque et al. ............... 423/611 |
| 4,075,031 A | 2/1978 | Allen |
| 4,079,028 A | 3/1978 | Emmons et al. |
| 4,235,985 A * | 11/1980 | Tanaka et al. ............... 526/279 |
| 5,023,309 A | 6/1991 | Kruse et al. |
| 5,201,949 A | 4/1993 | Allen et al. |
| 5,203,916 A | 4/1993 | Green et al. |
| 5,332,433 A | 7/1994 | Story et al. |
| 5,700,318 A | 12/1997 | Brand et al. |
| 5,840,112 A | 11/1998 | Morris et al. |
| 5,922,120 A | 7/1999 | Subramanian et al. |
| 5,976,237 A | 11/1999 | Halko et al. |
| 6,080,802 A | 6/2000 | Emmons et al. |
| 6,207,131 B1 | 3/2001 | Magyar et al. |
| 6,262,152 B1 | 7/2001 | Fryd et al. |
| 6,350,427 B1 | 2/2002 | Yuill et al. |
| 6,562,314 B2 | 5/2003 | Akhtar et al. |
| 7,179,531 B2 | 2/2007 | Brown et al. |
| 7,264,672 B1 * | 9/2007 | Trabzuni et al. ............... 106/443 |
| 8,163,078 B2 | 4/2012 | Tarng et al. |
| 2005/0228124 A1 | 10/2005 | Swarup et al. |
| 2006/0000390 A1 | 1/2006 | Bolt et al. |
| 2006/0188722 A1 | 8/2006 | White et al. |
| 2009/0253853 A1 | 10/2009 | Lin et al. |
| 2012/0058278 A1 | 3/2012 | Bohling et al. |
| 2013/0096250 A1 | 4/2013 | Bohling et al. |
| 2014/0011943 A1 | 1/2014 | Bardman et al. |
| 2014/0194566 A1 | 7/2014 | Auld et al. |
| 2014/0275442 A1 | 9/2014 | Goparaju et al. |

FOREIGN PATENT DOCUMENTS

| | | |
|---|---|---|
| WO | 2011112171 A1 | 9/2011 |
| WO | 2012008441 A1 | 1/2012 |
| WO | 2012058093 A1 | 5/2012 |
| WO | 2012116025 A1 | 8/2012 |
| WO | 2013002999 A1 | 1/2013 |
| WO | 2013004004 A1 | 1/2013 |
| WO | 2013032782 A1 | 3/2013 |
| WO | 2014150128 A1 | 9/2014 |

OTHER PUBLICATIONS

Kostansek, Edward, Associative Polymer/Particle Dispersion Phase Diagrams III: Pigments, JCT Research, vol. 3, No. 3, Jul. 2006, pp. 165-171.

Svanholm, T. et al., Adsorption studies of associative interactions between thickener and pigment particles, Progress in Organic Coatings 30 (1997), pp. 167-171.

Melville, I. et al., Pigment Thickener Interactions in Emulsion Paints, Polymers Paint Colour Journal, Mar. 18, 1997, vol. 177, No. 4187, pp. 174-184.

Tarng, Ming-Ren, Unifying Model for Associative Thickener Influences on Waterborne Coatings: II. Competitive Adsorption of Nonionic Surfactants and HEUR Thickeners on Titanium Dioxide Pretreated with Inorganic Stabilizers and Organic Oligomeric Dispersants, Journal of Coatings Technology, vol. 74, No. 935, Dec. 2002.

Glass, Edward J., Adsorption of hydrophobically-modified, ethoxylated urethane thickeners on latex and titanium dioxide disperse phases, Advances in Colloid and Interface Science 79 (1999) 123-148.

* cited by examiner

TITANIUM DIOXIDE PIGMENT AND MANUFACTURING METHOD

Titanium dioxide pigments are used in connection with coating formulations (including paint and ink formulations), paper compositions, polymer compositions and other products. Such pigments are generally produced in powder form with specific properties and characteristics depending on the final application.

Titanium dioxide is a very effective, white opacifying pigment. It can be manufactured by either the sulfate process or the chloride process.

In the sulfate process for manufacturing titanium dioxide, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions.

In the chloride process for manufacturing titanium dioxide, a dry titanium dioxide ore is fed into a chlorinator together with coke and chlorine to produce a gaseous titanium halide (such as titanium tetrachloride). The produced titanium halide is purified and oxidized in a specially designed reactor at a high temperature to produce titanium dioxide particles having a desired particle size. Aluminum chloride is typically added to the titanium halide in the oxidation reactor to facilitate rutile formation and control particle size. The titanium dioxide and gaseous reaction products are then cooled, and the titanium dioxide particles are recovered.

Whether produced by the sulfate process or the chloride process, the produced titanium dioxide particles are typically coated with one or more hydrous metal oxide inorganic materials to modify or enhance the properties and characteristics of the pigment for particular applications. For example, the pigment particles are often coated with compounds that function to improve the opacity, light stability and durability of the pigment. Examples of hydrous metal oxide inorganic materials used to coat titanium dioxide pigments include alumina and silica.

A primary property that a titanium dioxide pigment contributes to paint, paper, plastic and other products is hiding power. The hiding power of a titanium dioxide pigment is based on the ability of the pigment to scatter light in the base product (for example, a paint formulation) to which it is added. The ability of the pigment to scatter light in the base product to which it is added (the "light scattering efficiency") of the pigment depends on various factors, including the particle size of the pigment, the difference in refractive index of the pigment particles and their surroundings (for example, a large difference in the refractive index of the pigment particles and the base product results in high scattering efficiency), and the proximity of the pigment particles to one another. These factors have been addressed in various ways with varying degrees of success.

A potential problem that is associated with the use of titanium dioxide pigments in aqueous based coating formulations (such as aqueous based paint formulations) is the tendency of the pigment particles to agglomerate in the coating formulations. Agglomeration of the pigment particles in an aqueous based coating formulation can adversely impact desirable properties of the pigment including the opacity, brightness, tint strength and other optical properties of the pigment.

For example, problematic pigment agglomeration in aqueous based paint formulations often occurs after a paint film has been applied to a substrate and while the paint film dries. This phenomenon, sometimes referred to as optical crowding, can decrease the light scattering efficiency of the pigment particles. Consequently, the tint strength of the pigment can be diminished.

The problem of agglomeration of the pigment particles in an aqueous based coating formulation is exacerbated when the pigment is utilized in the coating formulation at a high pigment volume concentration ("PVC"). When the PVC of the pigment in the coating formulation increases to a certain level, the light scattering efficiency of the pigment can substantially decrease. At high PVC values, the pigment particles are closer to one another which results in an overlap of the respective light scattering cross-sections of the particles and thereby reduces the light scattering efficiency of the dispersed pigment. In addition to the light scattering efficiency of the pigment, the optical crowding effect can also decrease the light stability, brightness and opacity of the pigment.

Various techniques have been utilized in an attempt to diminish the optical crowding effect and address the other problems noted above. For example, fillers and extenders such as clay, calcium carbonate, alumina and silica have been added to aqueous based coating formulations to space adjacent pigment particles apart from one another. Hollow sphere, opaque polymers have been added to aqueous based coating formulations to create air voids in the formulations that function to space the pigment particles apart. Also, pigment particles have been coated with certain inorganic compounds that function to modify the surface properties of the particles in a manner that discourages agglomeration of the particles.

Although such techniques have been utilized with varying degrees of success, there is still room for improvement.

BRIEF SUMMARY OF THE INVENTION

In one aspect, the invention provides a titanium dioxide pigment. The titanium dioxide pigment comprises a plurality of titanium dioxide particles, and a polymer deposited on the titanium dioxide particles for inhibiting agglomeration of the titanium dioxide particles in an aqueous based coating formulation. The titanium dioxide particles have anchoring moieties associated therewith for facilitating anchoring of a polymer to the particles. The polymer is a copolymer having anchoring groups for attaching to the anchoring moieties associated with the titanium dioxide particles, and hydrophobic end groups for attaching to the resin of the coating formulation.

In another aspect, the invention provides a method of manufacturing a titanium dioxide pigment. The method comprises: (a) manufacturing titanium dioxide particles; (b) treating the titanium dioxide particles to associate anchoring moieties with the particles for facilitating anchoring of a polymer to said particles; and (c) depositing a polymer on the titanium dioxide particles for inhibiting agglomeration of the particles in an aqueous based coating formulation. The polymer is a copolymer having anchoring groups for attaching to the anchoring moieties associated with the titanium dioxide particles, and hydrophobic end groups for attaching to the resin of the coating formulation.

DETAILED DESCRIPTION

Figure 1:
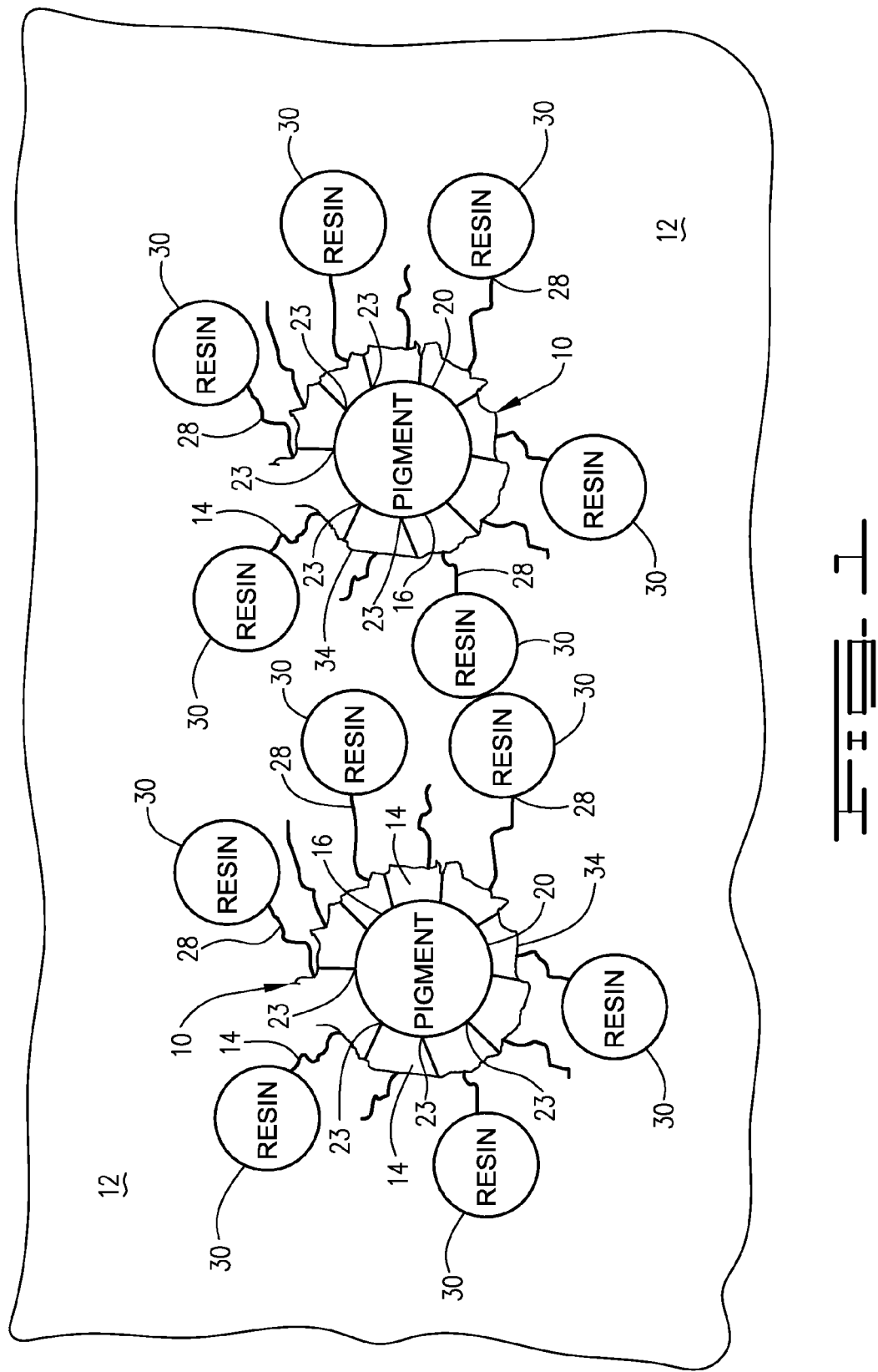
FIG. 1 schematically illustrates the interaction of the anti-agglomeration polymer of the inventive titanium dioxide pigment with the titanium dioxide particles of the pigment and the resin in an aqueous based coating formulation.

The invention includes a titanium dioxide pigment, and a method of manufacturing a titanium dioxide pigment.

As used herein and in the appended claims, an aqueous based coating formulation is a coating formulation that includes an aqueous based solvent and a resin. For example, the aqueous based coating formulation can be an aqueous based paint formulation or an aqueous based ink formulation. The aqueous based coating formulation is used to apply a coating on a substrate such as a wall of a structure or a piece of paper. The resin of the aqueous based coating formulation is the synthetic or natural resin that functions as the binder of the coating formulation. For example, the resin in the aqueous based coating formulation can be an acrylic resin, a vinyl acrylic resin or a styrene acrylic resin. In one embodiment, the aqueous based coating formulation is an aqueous based paint formulation.

The inventive titanium dioxide pigment comprises a plurality of titanium dioxide particles, and a polymer deposited on the titanium dioxide particles for inhibiting agglomeration of the titanium dioxide particles in an aqueous based coating formulation. As used herein and in the appended claims, unless stated otherwise, "deposited on the titanium dioxide particles" means the subject component (for example, the polymer) is deposited directly or indirectly on the titanium dioxide particles.

Any type of titanium dioxide particles can be used as the titanium dioxide particles of the inventive titanium dioxide pigment. For example, the titanium dioxide particles can be manufactured by either the sulfate process or the chloride process. In one embodiment, the titanium dioxide particles are rutile titanium dioxide particles manufactured by the chloride process.

The titanium dioxide particles of the inventive titanium dioxide pigment can contain alumina as part of their lattice structure. For example, aluminum chloride can be added to the reactants as a rutilization aid during the vapor phase oxidation step if the chloride process is used to manufacture the pigment. When present during the oxidation reaction, the aluminum chloride imparts alumina into the lattice structure of the pigment.

Other components can be incorporated into the titanium dioxide particles during the base manufacturing process as well. For example, inorganic oxides formed during the oxidation step of the chloride process can be included in the pigment for various purposes such as particle size control.

Regardless of the type of titanium dioxide particles utilized, the particles have anchoring moieties associated therewith for facilitating anchoring of the polymer to the particles. As used herein and in the appended claims, stating that the anchoring moieties are "associated with" the titanium dioxide particles means that the anchoring moieties are formed directly on the surfaces of the particles and/or on the surface(s) of one or more coatings that have been deposited on the surfaces of the titanium dioxide particles. For example, the anchoring moieties can be selected from the group consisting of hydroxyl moieties, phosphate moieties and mixtures thereof. In one embodiment, the anchoring moieties are hydroxyl moieties.

The anchoring moieties can be associated with the titanium dioxide particles in a number of ways. For example, the titanium dioxide particles can be digested in an alkaline or acid solution to form hydroxyl moieties on the surfaces of the titanium dioxide particles and/or any existing coating(s) thereon.

The anchoring moieties can also be associated with the titanium dioxide particles and/or any existing coating(s) thereon by coating the particles with a hydrous metal oxide coating. The anchoring moieties (for example, hydroxyl or phosphate moieties) are imparted to the titanium dioxide particles, any existing coating(s) thereon and/or the hydrous metal oxide coating that is formed during the coating process. For example, the deposition of a hydrous metal oxide coating onto the surfaces of the titanium dioxide particles and/or any existing coating(s) thereon forms hydroxyl groups on the surfaces of the titanium dioxide particles, the existing coating(s) (if present), and/or the new hydrous oxide metal coating depending on whether or not the existing coating(s) (if present) and new hydrous metal oxide coating are continuous or partial.

If a continuous hydrous metal oxide coating is formed on the titanium dioxide particles, the anchoring moieties that facilitate anchoring of the polymer to the particles will be on the surface of the coating. On the other hand, if a partial or patchy hydrous oxide coating is formed on the titanium dioxide particles, the anchoring moieties that facilitate anchoring of the polymer to the particles may be present on the surfaces of the titanium dioxide particles and the surface of the new coating. If one or more coatings (for example, other hydrous metal oxide coatings) already exist on the titanium dioxide particles, the anchoring moieties that facilitate anchoring of the polymer to the particles may be formed on the surfaces of the titanium dioxide particles, the existing coating(s) and/or the new hydrous metal oxide coating depending on whether the existing coating(s) and new coating are continuous or partial.

The polymer of the inventive titanium dioxide pigment (hereinafter the "anti-agglomeration polymer") is a copolymer that has anchoring groups for attaching to the anchoring moieties associated with the titanium dioxide particles, and hydrophobic end groups for attaching to the resin of the coating formulation. The anti-agglomeration polymer has both a hydrophobic moiety and a hydrophilic moiety. For example, the molecular weight of the anti-agglomeration polymer can be in the range of from about 10 kilodaltons to about 70 kilodaltons. By way of further example, the molecular weight of the anti-agglomeration polymer can be in the range of from about 15 kilodaltons to about 50 kilodaltons. By way of further example, the molecular weight of the anti-agglomeration polymer is in the range of from about 6 kilodaltons to about 100 kilodaltons.

For example, the anti-agglomeration polymer can include a polyether based repeating unit and a polyester based repeating unit, the polyether based repeating unit and the polyester based repeating unit being linked together. The polyether based repeating unit can be a polyol. The polyester based repeating unit can be a hydroxyl terminated polyester.

Examples of polyols that that are useful as the polyether based repeating unit include polyethyleneglycol, trimethylolpropane, pentaerythritol, mannitol, and mixtures thereof. In one embodiment, the polyether based repeating unit is polyethyleneglycol.

Suitable hydroxyl terminated polyesters for use as the polyester based repeating unit can be formed by reacting a polyol with a dicarboxylic acid. In one embodiment, the polyol reacted with the dicarboxylic acid is polyethyleneglycol. Examples of suitable dicarboxylic acids include glutaric acid, adipic acid, azelaic acid and mixtures thereof.

In one embodiment, the polyether based repeating unit and the polyester based repeating unit are linked together by a urethane linkage. For example, the urethane linkage is a diisocyanate. By way of further example, the urethane linkage is an aliphatic diisocyanate. An example of a suitable aliphatic diisocyanate is isophorone diisocyanate.

In one embodiment, the hydrophobic end groups of the anti-agglomeration polymer for attaching the polymer to the resin of the coating formulation have the general formula:

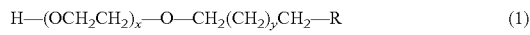

$$H-(OCH_2CH_2)_x-O-CH_2(CH_2)_y CH_2-R \qquad (1)$$

wherein:
x=2 to 20;
y=5 to 10; and
R is a hydrogen group or a phenyl group.

For example, the hydrophobic end groups can be oligomers of ethyleneglycol alkyl ethers. Examples of suitable oligomers of ethyleneglycol alkyl ethers include heptaethyleneglycol dodecyl ether, dodecaethyleneglycol dodecyl ether, pentadecaethyleneglycol dodecyl ether and mixtures thereof. In one embodiment, the hydrophobic end groups are dodecaethyleneglycol dodecyl ether.

For example, the anti-agglomeration polymer can comprise in the range of from about 50% to about 80% by weight of the polyether based repeating unit, in the range of from about 5% to about 40% by weight of the polyester based repeating units, and in the range of from about 0.5% to about 15% by weight of the hydrophobic end groups. By way of further example, the anti-agglomeration polymer can comprise in the range of from about 60% to about 70% by weight of the polyether based repeating unit, in the range of from about 15% to about 40% weight of the polyester based repeating units, and in the range of from about 2% about 10% by weight of the hydrophobic end groups.

For example, the anti-agglomeration polymer can be a random copolymer of polyether based polyurethanes and polyester based polyurethanes having end groups that are oligomers of ethyleneglycol alkyl ethers. Examples of such copolymers include a polyethyleneglycol based adipate with heptaethyleneglycol dodecyl ether as end groups, a polyethyleneglycol based adipate with dodecaethyleneglycol dodecyl ether as end groups, and a polyethyleneglycol based azileate with pentadecaethyleneglycol dodecyl ether as end groups. In one embodiment, the anti-agglomeration polymer is a polyethyleneglycol based adipate with heptaethyleneglycol dodecyl ether as end groups.

In order to enhance the propensity of the anti-agglomeration polymer to attach to the titanium dioxide particles, the inventive titanium dioxide pigment can also include a non-ionic surfactant deposited on the titanium dioxide particles. In one embodiment, the non-ionic surfactant (hereinafter the "pigment surfactant") is deposited on the titanium dioxide particles before the anti-agglomeration polymer is deposited on the particles.

For example, the "pigment surfactant" can be a hydrocarbon having in the range of 10 to 20 carbon atoms. In one embodiment, the pigment surfactant is a hydrocarbon having in the range of 12 to 18 carbon atoms. For example, the pigment surfactant can be a hydrocarbon having in the range of 15 to 18 carbon atoms.

For example, the pigment surfactant can be a saturated aliphatic hydrocarbon, an unsaturated aliphatic hydrocarbon having one or more double bonds, an unsaturated aliphatic hydrocarbon having one or more ethoxylated hydrocarbon chains, or a mixture of such compounds. The pigment surfactant can include one or more functional groups selected from the group of amines, amides, carboxylates, esters, hydroxyls, phosphates, silanes, sulfonates, and thiols. In one embodiment, the pigment surfactant has a hydrophilic-lipophilic balance of 10 to 18. For example, the pigment surfactant can have a hydrophilic-lipophilic balance of 10 to 16. By way of further example, the pigment surfactant can have a hydrophilic-lipophilic balance of 12 to 18.

Specific examples of non-ionic surfactants that can be utilized as the pigment surfactant of the inventive titanium dioxide pigment include polyethyleneglycol monoether with oleic acid; alcohol ethoxylates; and block copolymers of polyethyleneglycol and polypropyleneglycol. Examples of commercially available non-ionic surfactants that can be utilized as the pigment surfactant of the inventive titanium dioxide pigment include ECOSURF™ LF-45 (a non-ionic secondary alcohol alkoxylate surfactant sold by The Dow Chemical Company); PLURONIC® P-123 (a di-functional non-ionic block copolymer surfactant terminating in primary hydroxyl groups sold by BASF Corporation); AGNIQUE® PG 9116 (an alkyl polyglycoside surfactant sold by Cognis Corporation); ENVIROGEM® 2010 (a multifunctional surfactant sold by Air Products and Chemicals, Inc.); and CARBOWET® 13-40 (a multifunctional surfactant sold by Air Products and Chemicals, Inc.).

In one embodiment, the pigment surfactant is deposited on the pigment in an amount in the range of from about 0.1 to about 5% by weight, based on the total weight of the pigment. For example, the pigment surfactant can be deposited on the pigment in an amount in the range of from about 0.1 to about 2% by weight, based on the total weight of the pigment. By way of further example, the pigment surfactant is deposited on the pigment in an amount in the range of from about 0.1 to about 0.5% by weight, based on the total weight of the pigment.

In another embodiment, the inventive titanium dioxide pigment also includes one or more hydrous metal oxide inorganic materials deposited onto the surfaces of the titanium dioxide particles in order to modify or enhance the properties and characteristics of the pigment for particular applications. As stated above, coating the titanium dioxide particles with one or more hydrous metal oxides can impart the anchoring moieties (for example, hydroxyl and/or phosphate moieties) to the treated pigment that facilitate anchoring of the polymer (directly or indirectly) to the titanium dioxide particles.

The hydrous metal oxide inorganic materials deposited onto the surfaces of the titanium dioxide particles in order to modify or enhance the properties and characteristics of the pigment for particular applications (hereinafter "pigment coating materials") are deposited on the titanium dioxide polymers before the anti-agglomeration polymer is deposited on the polymers. Examples of pigment coating materials that can be utilized include metal oxides and metal hydroxides such as alumina, aluminum phosphate, silica, zirconia, titania and mixtures thereof. For example, one or more pigment coating materials can be deposited onto the pigment particles to improve the opacity, light stability and durability of the pigment. By way of further example, one or more pigment coating materials can be used to achieve a desired balance of pigment opacity and flow characteristics. As another example, one or more pigment coating materials can be used to improve the wetting and dispersing properties of the pigment.

In one embodiment, one or more pigment coating materials selected from the group of alumina and silica are deposited on the titanium dioxide particles. Silica can be used, for example, to impart improved resistance to the deleterious effects of ultraviolet light in end-use applications, or to further enhance the hiding power of the pigment. Alumina can be used, for example, to ensure smooth processing through filtration, drying, and fluid energy milling, as well as to impart improved dispersibility characteristics to the finished pigment in end-use applications.

Silicon dioxide (for example, a dense silicon dioxide coating) can be used, for example, to improve the durability and resin compatibility of the pigment. An aluminum oxide coating can be used on top of the silicon dioxide coating, for example, to improve opacifying properties and resin compatibility in paint applications. Aluminum phosphate, related phosphate salts and mixtures thereof can be used, for example, as an alternative to silicon dioxide to provide improved pigment durability. An aluminum oxide coating can be placed on top of the aluminum phosphate coating, as discussed above.

For example, the pigment coating material(s) can be included in the inventive titanium dioxide pigment in an amount in the range of from about 0.5% by weight to about 15% by weight, based on the total weight of the pigment.

The inventive method of manufacturing a titanium dioxide pigment comprises the steps of:
(a) manufacturing titanium dioxide particles;
(b) treating said titanium dioxide particles to associate anchoring moieties with said particles for facilitating anchoring of a polymer to said particles; and
(c) depositing a polymer on the titanium dioxide particles for inhibiting agglomeration of the particles in an aqueous based coating formulation, wherein said polymer is a copolymer having anchoring groups for attaching to said anchoring moieties associated with said titanium dioxide particles, and hydrophobic end groups for attaching to the resin of said coating formulation.

Any type of titanium dioxide particles can be manufactured in accordance with the inventive method. For example, the titanium dioxide particles can be manufactured by either the sulfate process or the chloride process. In one embodiment, step (a) comprises manufacturing rutile titanium dioxide particles by the chloride process.

Methods for manufacturing titanium dioxide particles by the sulfate process and the chloride process are well known to those skilled in the art. For example, in the sulfate process, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions. For example, in the chloride process, a dry titanium dioxide ore is fed into a chlorinator together with coke and chlorine to produce a gaseous titanium halide (such as titanium tetrachloride). The produced titanium halide is purified and oxidized in a specially designed reactor at a high temperature to produce titanium dioxide particles having a desired particle size. The titanium dioxide and gaseous reaction products are then cooled, and the titanium dioxide particles are recovered.

For example, in the chloride process, aluminum chloride can be added to the reactants as a rutilization aid and particle size control agent along with the titanium halide (for example, the titanium tetrachloride) during the vapor phase oxidation step of the manufacturing process. The aluminum chloride imparts alumina into the lattice structure of the pigment. Other co-oxidants can be used as well. Other hydrous metal oxide oxides formed during the oxidation step can be included in the pigment for various purposes such as particle size control.

As discussed above, the titanium dioxide particles can be treated to associate anchoring moieties with the particles for facilitating anchoring of a polymer to the particles in a number of ways. For example, the titanium dioxide particles can be digested in an alkaline or acid solution to impart hydroxyl moieties to the particles. The pigment can be subsequently washed to remove excess salts formed during this process. The anchoring moieties can also be associated with the titanium dioxide particles by coating the particles with one or more hydrous metal oxide inorganic materials, as discussed above and further below. For example, the anchoring moieties can be selected from the group consisting of hydroxyl moieties, phosphate moieties and mixtures thereof. In one embodiment, the anchoring moieties are hydroxyl moieties.

The polymer deposited on the titanium dioxide particles in accordance with the inventive method is the anti-agglomeration polymer of the inventive titanium dioxide pigment, as described above.

The anti-agglomeration polymer can be deposited on the titanium dioxide particles during the pigment manufacturing process. As used herein and in the appended claims, "during the pigment manufacturing process" means after the base titanium dioxide particles are formed in a manufacturing plant and before the pigment particles are transported from the manufacturing plant to another destination.

The anti-agglomeration polymer can be deposited on the titanium dioxide particles by, for example, adding a solution of the polymer (for example, an aqueous solution containing 30% by weight of the anti-agglomeration polymer, based on the weight of the solution) to the drier feed of the pigment in the pigment drying step after the pigment is washed. Such a polymer solution can also be added to the pigment before or after the particle size of the pigment is reduced (for example, by micronization) to the desired particle size distribution.

In one embodiment, the anti-agglomeration polymer is deposited on the pigment in an amount in the range of from about 0.05% to about 2% by weight, based on the total weight of the pigment. For example, the anti-agglomeration polymer can be deposited on the pigment in an amount in the range of from about 0.05% to about 1% by weight, based on the total weight of the pigment. By way of further example, the anti-agglomeration polymer is deposited on the pigment in an amount in the range of from about 0.05% to about 0.5% by weight, based on the total weight of the pigment.

In one embodiment of the inventive method, a non-ionic surfactant is deposited on the titanium dioxide particles to enhance the propensity of the anti-agglomeration polymer to attach to the titanium dioxide particles. The non-ionic surfactant deposited on the titanium dioxide particles in accordance with the inventive method is the pigment surfactant of the inventive titanium dioxide pigment, as described above.

The pigment surfactant can also be deposited on the titanium dioxide particles during the pigment manufacturing process. For example, the pigment surfactant can be deposited on the titanium dioxide particles during the pigment manufacturing process before the anti-agglomeration polymer is deposited on the titanium dioxide particles. Deposition of the pigment surfactant on the titanium dioxide particles before the anti-agglomeration polymer is deposited on the titanium dioxide particles can increase the effectiveness of the pigment surfactant in enhancing the propensity of the anti-agglomeration polymer to attach to the titanium dioxide particles.

The pigment surfactant can be deposited on the titanium dioxide particles by, for example, spraying a solution of the pigment surfactant (for example, an aqueous solution containing 70% by weight of the pigment surfactant, based on the weight of the solution) onto the titanium dioxide particles. The pigment surfactant can also be deposited on the titanium dioxide particles by adding such a solution to the drier feed of the pigment after the pigment is washed, or to the pigment before or after the particle size of the pigment is reduced (for example, by micronization) to the desired particle size distribution.

In one embodiment, the pigment surfactant is deposited on the pigment in an amount in the range of from about 0.1 to about 5% by weight, based on the total weight of the pigment. For example, the pigment surfactant can be deposited on the pigment in an amount in the range of from about 0.1 to about 2% by weight, based on the total weight of the pigment. By way of further example, the pigment surfactant is deposited on the pigment in an amount in the range of from about 0.1 to about 0.5% by weight, based on the total weight of the pigment.

In another embodiment, the inventive method further comprises the step of depositing one or more pigment coating materials onto the titanium dioxide particles to modify or enhance the properties and characteristics of the pigment for particular applications. As stated above, this step can be used to associate the anchoring moieties (for example, hydroxyl or phosphate moieties) with the titanium dioxide particles. Examples of pigment coating materials and uses thereof are discussed above and further below.

The pigment coating material(s) can also be deposited on the titanium dioxide particles during the pigment manufacturing process. For example, the pigment coating material(s) can be deposited on the titanium dioxide particles during the pigment manufacturing process before the pigment surfactant (if used) and anti-agglomeration polymer are deposited on the titanium dioxide particles. The pigment coating material(s) can be deposited on the titanium dioxide particles, for example, in an in situ precipitation process, as described below.

For example, the pigment coating material(s) can be added to the titanium dioxide pigment in an amount in the range of from about 0.2% by weight to about 20% by weight, based on the total weight of the pigment. By way of further example, the pigment coating material(s) can be added to the titanium dioxide pigment in an amount in the range of from about 0.5% by weight to about 12% by weight, based on the total weight of the pigment. In one embodiment, the pigment coating material(s) are added to the titanium dioxide pigment in an amount in the range of from about 1.0% by weight to about 15% by weight, based on the total weight of the pigment.

In one embodiment, the inventive method includes the steps of:

(a) manufacturing titanium dioxide particles, as described above;

(b) reducing the particle size of the titanium dioxide particles;

(c) depositing one or more pigment coating materials onto the titanium dioxide particles, as described above;

(d) recovering the treated titanium dioxide particles;

(e) washing the treated titanium dioxide particles to remove salts and impurities, therefrom;

(f) depositing the pigment surfactant on the titanium dioxide particles, as described above;

(g) depositing the anti-agglomeration polymer on the titanium dioxide particles, as described above;

(h) drying the washed titanium dioxide particles;

(i) reducing the particle size of the titanium dioxide particles to the desired particle size distribution; and (j) packaging the pigment for shipment from the manufacturing plant to another destination.

After the titanium dioxide particles are manufactured in accordance with step (a), they are mixed into an aqueous medium to form an aqueous slurry. If necessary or desired, a dispersing agent such as a polyphosphate can be added to the aqueous slurry to facilitate distribution of the titanium dioxide particles therein.

For example, the titanium dioxide particles can be added to the aqueous slurry in an amount in the range of from about 5% by weight to about 65% by weight, based on the total weight of the slurry. By way of further example, the titanium dioxide particles are added to the slurry in an amount in the range of from about 15% by weight to about 45% by weight, based on the total weight of the slurry. In one embodiment, the titanium dioxide particles are added to the aqueous slurry in an amount in the range of from about 25% by weight to about 40% by weight, based on the total weight of the slurry.

The particle size of the titanium dioxide particles can then be reduced in step (b), for example, by a wet milling process. The aqueous slurry is wet milled to achieve a predetermined particle size.

As discussed above, depositing one or more pigment coating materials onto the titanium dioxide particles in accordance with step (c) associates the anchoring moieties (for example, hydroxyl or phosphate moieties) with the titanium dioxide particles. The anchoring groups of the polymer anchor to the anchoring moieties.

Methods by which pigment coating material(s) can be deposited or co-deposited onto the titanium dioxide particles are also well known to those skilled in the art. For example, the pigment coating materials can be precipitated onto the titanium dioxide particles in situ in the aqueous slurry. In such a process, for example, the pigment coating material can be incrementally added to the aqueous slurry as an aqueous metal oxide salt solution. The pH of the slurry can be adjusted and maintained at a level that causes precipitation of the pigment coating material to occur.

A dissolved alkali-soluble salt can be included in the solution, for example, in an amount in the range of from about 5% by weight to about 40% by weight, based on the total weight of the solution. For example, the salt can be sodium, potassium or a mixture thereof. In order to control the pH of the slurry, strong inorganic acids such as hydrochloric acid, nitric acid, sulfuric acid and salts thereof can be used.

In one embodiment, silica and alumina are deposited onto the surfaces of the titanium dioxide particles. For example, it may be advantageous to deposit alumina as the final treatment layer on the particles.

The treated titanium dioxide particles can then be recovered and washed in accordance with steps (d) and (e) by methods known to those skilled in the art. For example, the particles can be recovered by filtration (to form a filter cake of the particles) and washed using conventional vacuum-type and/or pressure-type filtration systems. The wet treatment deposition of the pigment coating material(s) onto the titanium dioxide particles (for example, onto the wet-milled titanium dioxide particles) helps enable the pigment to be recovered and washed using conventional vacuum-type and/or pressure-type filtration systems.

Methods by which the pigment surfactant can be deposited on the titanium dioxide particles in accordance with step (f)

are discussed above. By way of further example, the pigment surfactant can be added to a slurry of the treated titanium dioxide particles after the particles have been washed in accordance with step (e) but before the particles are dried and reduced in size in accordance with steps (h) and (i). Alternatively, for example, the pigment surfactant can be added to the titanium dioxide particles in accordance with step (f) after the particles are dried in accordance with step (h) but before the particles are reduced in size in accordance with step (i). For example, a solution of the pigment surfactant (for example, an aqueous solution containing 70% by weight of the pigment surfactant, based on the weight of the solution) can be sprayed onto the titanium dioxide particles before the particle size reduction step. As another alternative, for example, a solution of the pigment surfactant (for example, an aqueous solution containing 70% by weight of the pigment surfactant, based on the weight of the solution) can be sprayed onto the titanium dioxide particles after the particle size of the particles is reduced in accordance with step (i) but before the pigment is packaged in accordance with step (j). If the final titanium dioxide pigment formed in accordance with the inventive method is packaged in slurry form, the pigment surfactant can also be added during formation of the slurry, as described below.

Methods by which the anti-agglomeration polymer can be deposited on the titanium dioxide particles in accordance with step (g) are also discussed above. By way of further example, the anti-agglomeration polymer can be added to a slurry of the treated titanium dioxide particles after the particles have been washed in accordance with step (e) but before the particles are dried and reduced in size in accordance with steps (h) and (i). Alternatively, for example, the anti-agglomeration polymer can be added to the titanium dioxide particles in accordance with step (f) after the particles are dried in accordance with step (h) but before the particles are reduced in size in accordance with step (i). For example, a solution of the anti-agglomeration polymer (for example, an aqueous solution containing 30% by weight of the anti-agglomeration polymer, based on the weight of the solution) can be sprayed onto the titanium dioxide particles before the particle size reduction step. As another alternative, for example, a solution of the anti-agglomeration polymer (for example, an aqueous solution containing 30% by weight of the anti-agglomeration polymer, based on the weight of the solution) can be sprayed onto the titanium dioxide particles after the particle size of the particles is reduced in accordance with step (i) but before the pigment is packaged in accordance with step (j). If the final titanium dioxide pigment formed in accordance with the inventive method is packaged in slurry form, the anti-agglomeration polymer can also be added during formation of the slurry, as described below.

In one embodiment, the anti-agglomeration polymer is deposited on the titanium dioxide particles after the pigment surfactant is deposited onto the titanium dioxide particles. In another embodiment, the pigment surfactant and anti-agglomeration polymer are added to the titanium dioxide particles at the same time. For example, a single solution containing both the pigment surfactant and the anti-agglomeration polymer in the amounts noted above can be sprayed onto the titanium dioxide particles.

The pigment surfactant and anti-agglomeration polymer can also be deposited on the titanium dioxide particles in more than one step. For example, solutions of the pigment surfactant and anti-agglomeration polymer can be added to the drier feed. After stirring (for example, for 15 or 20 minutes), individual solutions or a combined solution of the pigment surfactant and anti-agglomeration polymer can also be sprayed onto the dried pigment.

The washed titanium dioxide particles can be dried in accordance with step (h), for example, by vacuum drying, spin-flash drying, spray drying or other techniques known to those skilled in the art to produce a dry titanium dioxide pigment powder. In one embodiment, the titanium dioxide particles are dried by spray drying the particles.

The particle size of the dried titanium dioxide particles can be reduced to the desired particle size distribution by, for example, dry milling the particles. For example, a fluid energy mill can be used to dry mill the particles. Alternatively, the dried particles can be reduced to the desired particle size distribution by steam micronization techniques.

The finished product is then packaged for transportation from the manufacturing plant to another destination. For example, the dried and milled finished titanium dioxide pigment can be placed in bags and shipped therein. Alternatively, an aqueous slurry of the dried and milled finished titanium dioxide pigment can be formed to contain the desired amount of pigment and placed and shipped in slurry containers. For example, a typical final pigment slurry can contain in the range of from about 70% to about 80% by weight of the finished titanium dioxide pigment based on the total weight of the slurry.

Referring now to the drawings and particularly to FIG. 1, operation of the inventive titanium dioxide pigment 10 in an aqueous based coating formulation 12 is schematically illustrated. The anti-agglomeration polymer 14 of the pigment 10 is deposited on the titanium dioxide particles 20 (for example, directly on the particles via anchoring moieties on the surfaces of the particles or indirectly on the particles via anchoring moieties on an hydrous metal oxide coating that is deposited on the particles). The anchoring groups 23 of the anti-agglomeration polymer 14 interact with the anchoring moieties associated with the titanium dioxide particles and attach the polymer (directly or indirectly) to the titanium dioxide particles 20. The hydrophobic end groups 28 of the anti-agglomeration polymer 14 interact with the resin particles 30 in the aqueous based paint formulation 12 to form a network 34 therein. The end result is that the anti-agglomeration polymer 14 of the inventive titanium dioxide pigment 10 results in a more uniform distribution of the titanium dioxide particles 10 in the aqueous based coating formulation 12.

Figure 2:
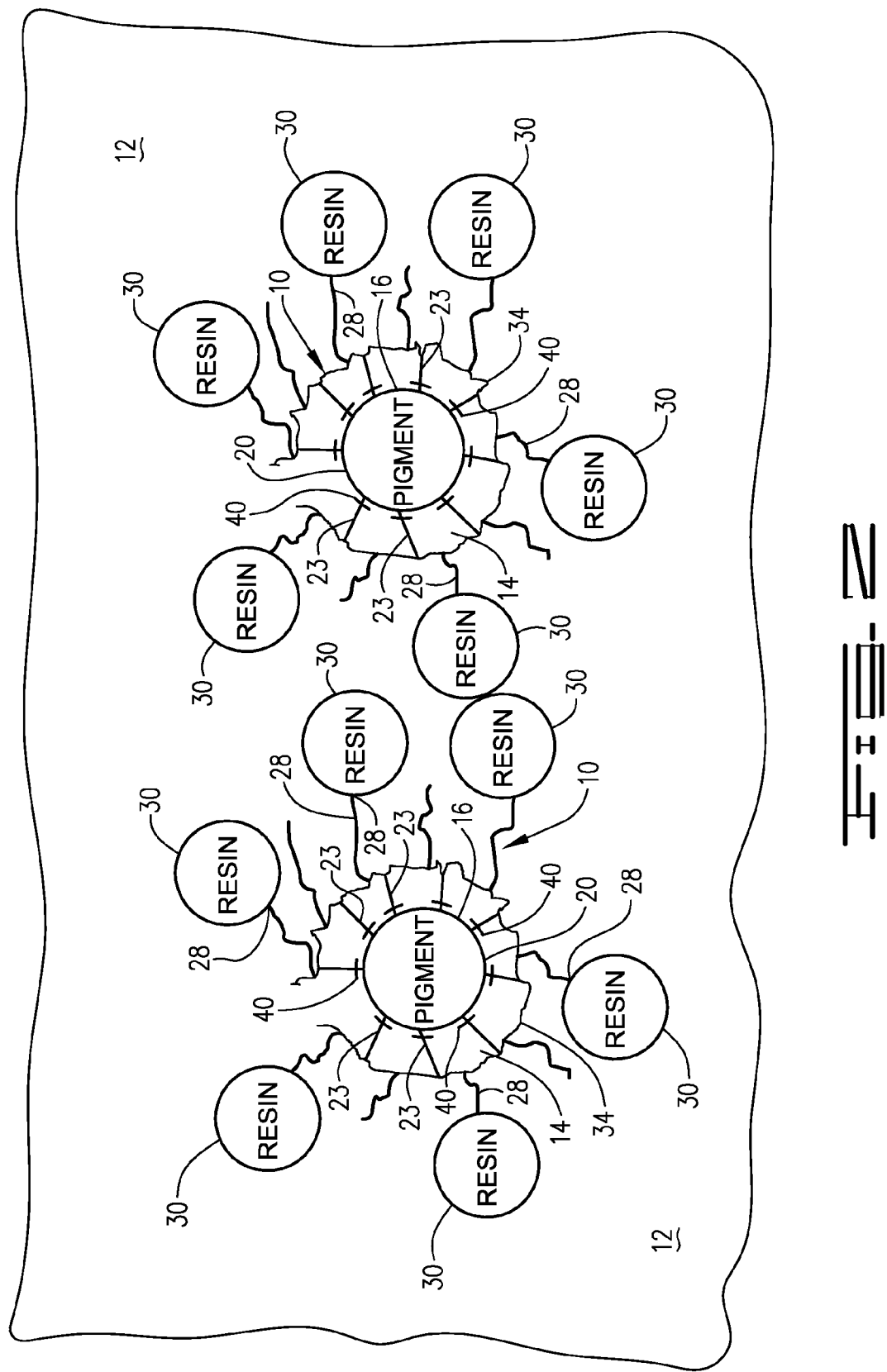
FIG. 2 is identical to FIG. 1 except that it also shows operation of the pigment surfactant 40 to enhance the propensity of the anti-agglomeration polymer to attach to the titanium dioxide particles.

FIG. 2 is identical to FIG. 1 except that it also shows operation of the pigment surfactant 40 to enhance the propensity of the anti-agglomeration polymer 14 to attach (directly or indirectly) to the titanium dioxide particles 20.

Figure 3A:
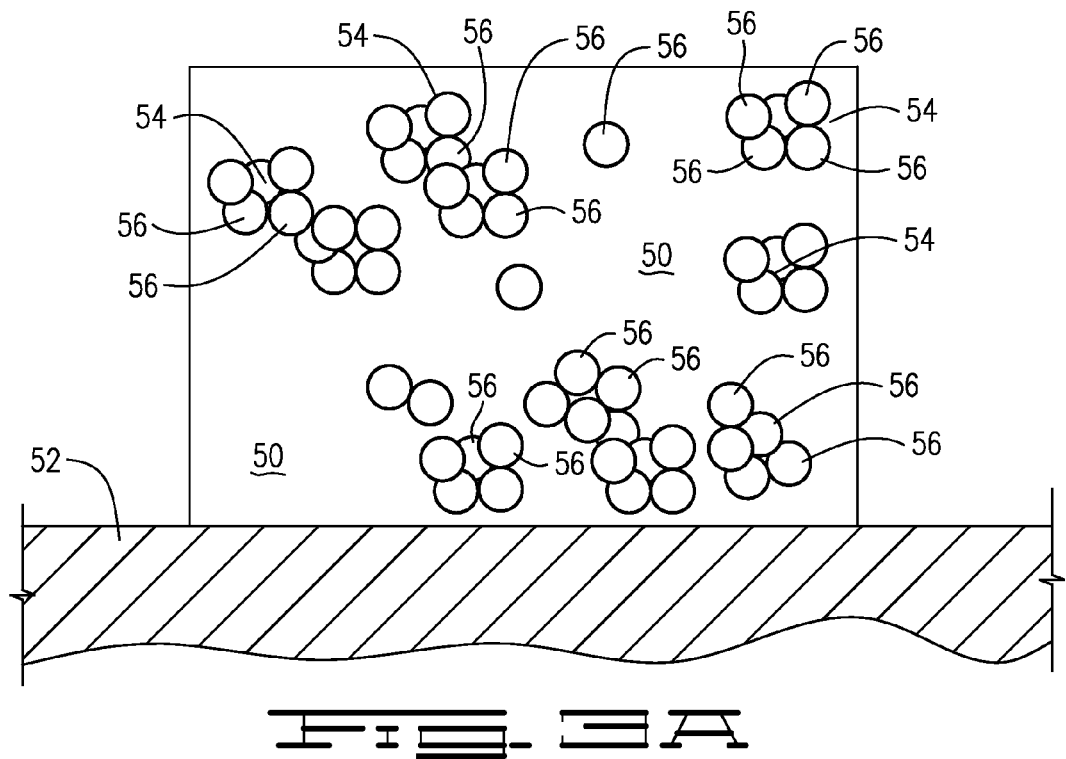
FIG. 3A schematically illustrates an aqueous based paint film that has been applied to a substrate and allowed to dry. The paint film in FIG. 3A includes a titanium dioxide pigment that does not include an anti-agglomeration polymer. As shown, problematic pigment particle agglomeration has occurred.

FIG. 3A illustrates an aqueous based paint film 50 that has been applied to a substrate 52 and allowed to dry. The paint film 50 includes a titanium dioxide pigment 54 that does not comprise an anti-agglomeration polymer. As shown, the titanium dioxide particles 56 of the pigment 54 are agglomerated together in the paint film 50 which can decrease the light scattering efficiency and lower the tint strength of the pigment particles.

Figure 3B:
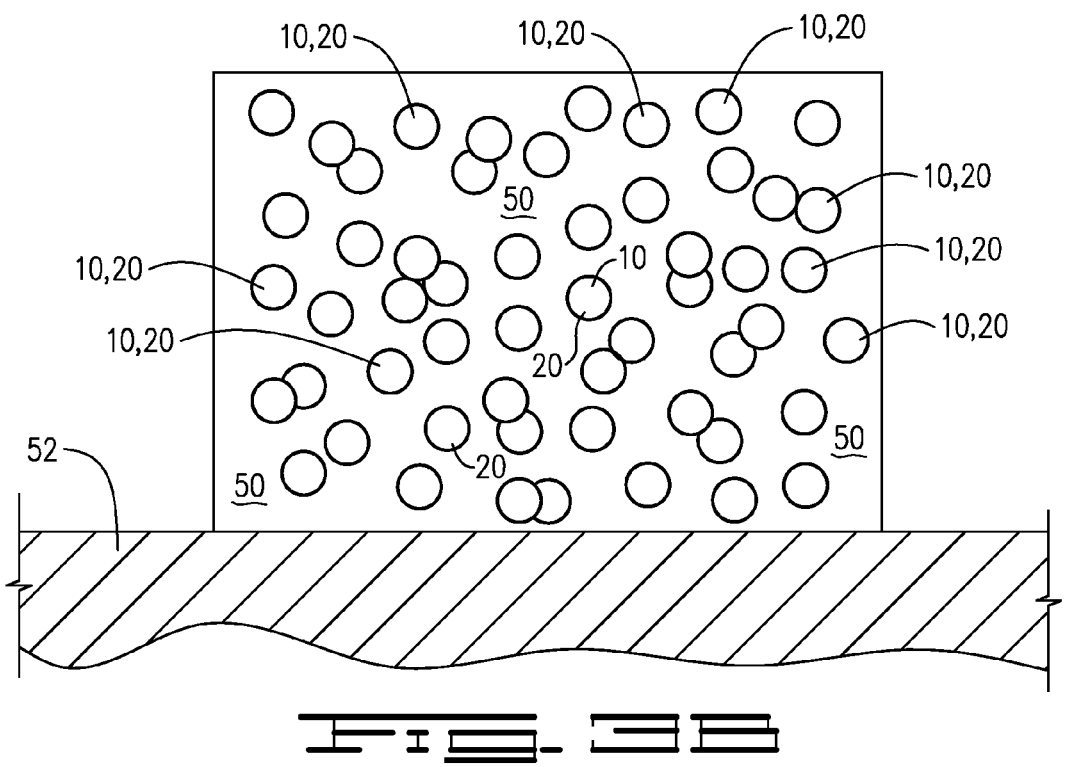
FIG. 3B also schematically illustrates an aqueous based paint film that has been applied to a substrate and allowed to dry. The paint film in FIG. 3B, however, includes a titanium dioxide pigment that comprises an anti-agglomeration polymer in accordance with the invention. As shown, significantly less pigment particle agglomeration has occurred.

FIG. 3B also illustrates an aqueous based paint film 50 that has been applied to a substrate 52 and allowed to dry. In this case, however, the paint film 50 includes the inventive titanium dioxide pigment 10 which includes an anti-agglomeration polymer 14. As shown, less agglomeration of the titanium dioxide particles 20 of the inventive pigment 10 has occurred which will result in a good light scattering efficiency and higher tint strength of the pigment.

While not intending to be bound by any particular theory of operation, it is believed that effectiveness of the anti-agglomeration polymer 14 of the inventive titanium dioxide pigment 10 is due to a number of factors. The nature and number of the anchoring groups of the polymer 14 (for example, carbonyl, hydroxyl, alkoxy or amine groups) allows the polymer to effectively bind to the pigment particles 20. The hydrophobic end groups form micelles which interact with the surfaces of the resin particles. The network 34 formed by interaction of the hydrophobic end groups 28 of the polymer 14 with the resin particles 30 of the aqueous based paint formulation 12 effectively keeps the particles from agglomerating. The anti-agglomeration polymer 14 is compatible with the aqueous based coating formulation 12, and this compatibility extends throughout the final drying stages of the formulation on a substrate. The molecular weight and polymer chain lengths associated with the anti-agglomeration polymer 14 are sufficient to overcome van der Waals forces of attraction between titanium dioxide particles which helps prevent agglomeration of the particles. It is believed that both electrostatic and steric forces are responsible for dispersion stability of the pigment particles in an aqueous based paint formulation; however, the steric forces may play a dominant role to minimize the crowding effect of the pigment particles during drying of the paint film.

The pigment surfactant 40 of the inventive titanium dioxide pigment, when the pigment surfactant is utilized, enhances the propensity of the anti-agglomeration polymer 14 to attach (directly or indirectly) to the titanium dioxide particles 20. Again, while not wanting to be bound by any particular theory of operation, it is believed that the chains of the polymer 14 are strongly solvated by aqueous media which prevents the chains from collapsing on the surfaces of the titanium dioxide particles 20 onto which they are anchored. The pigment surfactant enhances the wetting of the titanium dioxide particles (directly or as treated with one or more hydrous metal oxide coatings) which aids in the anchoring of the polymer to the pigment.

The fact that the anti-agglomeration polymer 14 and pigment surfactant 40 (when used) can be deposited on the titanium dioxide particles 20 during the pigment manufacturing process allows the inventive titanium dioxide pigment 10 to be provided to and used by aqueous based coating formulation manufacturers in dry or slurry form. The ability to provide the finished pigment 10 in dry form allows it to be readily added to existing coating formulations without creating compatibility issues and adversely affecting the formulations. The coating formulations do not need to be modified to accommodate the inventive titanium dioxide pigment. For example, a paint manufacturer can merely add the inventive titanium dioxide pigment 10 directly to an existing paint formulation.

Due to the inhibition of particle agglomeration achieved by the anti-agglomeration polymer 14, the inventive titanium dioxide pigment has a higher dispersion stability and light scattering efficiency, which results in an increased tint strength. The uniform distribution of the pigment particles 20 during drying of a paint film with minimal crowding of the particles makes the inventive pigment 10 very suitable for use in connection with aqueous based coating formulations.

Due to the inhibition of agglomeration achieved by the inventive titanium dioxide pigment 10, the inventive titanium dioxide pigment is particularly effective for use in aqueous based paint and other coating formulations that have a relatively high pigment volume concentration ("PVC"). Due to the proximity of the titanium dioxide particles to one another, particle agglomeration and optical crowding can be particularly problematic at high PVCs. The inventive titanium dioxide pigment helps overcome this problem. For example, aqueous based coating formulations having a PVC of 15% and higher can be formed using the inventive titanium dioxide pigment 10 without sacrificing light scattering efficiency and tint strength due to problematic agglomeration and optical crowding.

The present invention is exemplified by the following examples, which are given by way of example only and should not be taken as limiting of the present invention in any way.

Example I

Synthesis of Inventive Polymer

By the following prophetic example, one manner in which the anti-agglomeration polymer of the inventive titanium dioxide pigment can by synthesized is illustrated.

First, a hydroxy terminated polyester is synthesized by a condensation reaction between polyethyleneglycol and adipic acid. Approximately 374 grams of ethylene glycol are placed in a one liter three necked flask equipped with a condenser, a gas inlet and a thermometer. The ethylene glycol is heated under approximately 76 mm Hg to 90° C., at which point 69 grams of adipic acid is added to the flask. The reaction mixture in the flask is then heated to 200° C. The water formed during the reaction is removed by distillation. After approximately five hours, the pressure in the flask is reduced to 25 mm Hg and the admixture was allowed to react for 36 hours. The molecular weight of the resulting polymer is estimated from the hydroxyl number to be approximately 2000.

Next, approximately 300 milliliters of toluene, 100 grams of polyethyleneglycol (having a molecular weight of approximately 8,000) and 10 g of the polyesterol synthesized above are added to a three necked one liter flask equipped with a condenser, a gas inlet and a thermometer. The mixture in the flask is dried by passing nitrogen gas through the flask and heating the contents of the flask to 100° C. The contents of the flask are then cooled to 75° C. At this point, 0.1 grams of dibutyl dilaurate, 3.4 grams of isophorone diisocyanate, and 0.09 grams of ethylene diamine are added to the flask and the contents of the flask are stirred for 3 hours at 75° C. Thereafter, 0.8 grams of heptaethylene glycol mono dodecyl ether is added to the flask and the contents are stirred for an additional hour. The mixture is then cooled and the solvent is evaporated to yield the anti-agglomeration polymer of the inventive titanium dioxide pigment.

Utilizing the above general method, various forms of the anti-agglomeration polymer of the inventive titanium dioxide pigment are synthesized. The anti-agglomeration polymer is synthesized with different combinations of polyether, polyester and end groups. The molecular weights of the polymers synthesized are in the range of from approximately 8000 to approximately 50,000. Examples of anti-agglomeration polymers that are synthesized are represented by the following formulas and table:

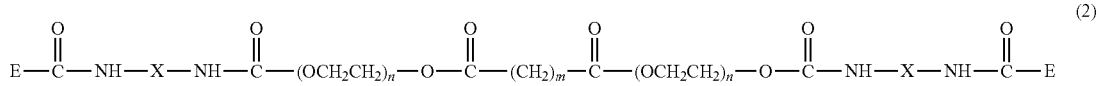

(2)

wherein:

E has the following formula:

$$H-(OCH_2CH_2)_y-O-CH_2(CH_2)_zCH_2-R \quad (3)$$

wherein:
y=2 to 20;
z is from 5 to 10; and
R is a hydrogen group or a phenyl group;
X is isocyanate (isophorone diisocyanate);
n is 60 to 200; and
m is 2 to 12.

TABLE 1

Sample Anti-Agglomeration Polymers of Inventive Pigment

| Polymer # | E | | M |
|---|---|---|---|
| | Y | R | |
| 1 | 2 | H | 2 (succinic acid) |
| 2 | 6 | H | 3 (glutaric acid) |
| 3 | 7 | H | 4 (adipic acid) |
| 4 | 9 | H | 9 (azelaic acid) |
| 5 | 10 | H | 3 |
| 6 | 12 | H | 4 |
| 7 | 15 | H | 4 |
| 8 | 15 | Phenyl | 4 |
| 9 | 16 | H | 4 |
| 10 | 16 | Phenyl | 4 |

The anti-agglomeration polymer of the inventive titanium dioxide pigment is not limited to the examples reflected by the Formulas (2) and (3) and TABLE 1 above. For example, the anti-agglomeration polymer can be formed using different combinations of end groups (E) and dioic (dicarboxylic) acids as represented by Formulas (2) and (3) above.

Example II

The anti-agglomeration polymer of the inventive titanium dioxide pigment was synthesized using the procedure described below.

Step 1: Ester Formation

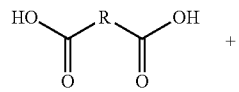

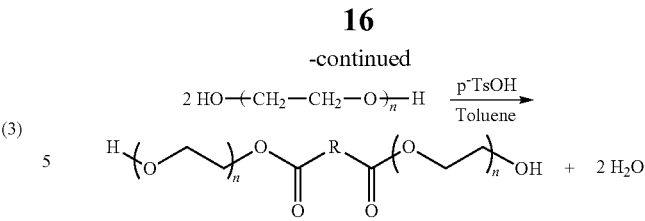

A 500 ml three-neck flask was charged with 90 g poly (ethylene glycol) (Aldrich, MW 6k, 15 mmol), 1.095 g adipic acid (Aldrich, MW 146 g/mol, 7.5 mmol) 0.022 g of pTsOH para tolune sulfonic acid) (Aldrich, 2% catalyst based on acid) and 160 ml toluene (Aldrich). The flask was put in an oil bath, connected with Dean-Stark trap and reflux condenser. The outlet of the condenser was connected with a drying tower to prevent moisture absorption from air. The reaction media was heated to reflux under magnetic agitation. When all the solids were dissolved, the sample was tested using FTIR for the starting spectrum. It was refluxed further under agitation, and water was removed by azeotropic distillation, forcing the reaction towards the right. Water was collected from the bottom of the Dean-Stark trap. When no more water was distilled out, it was refluxed further for one more hour. The sample was tested with FTIR to prove the formation of ester group and the elimination of carboxylic acid group. The reaction was stopped when no detectable carboxylic acid was presented from FTIR spectra. The final reaction media was cooled down to room temperature and kept for next step.

Step 2: Isocyanate Terminated Polyester-Poly(Ethylene-Glycol) Reaction Formula

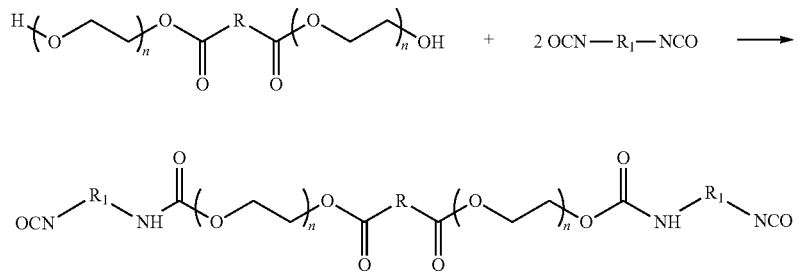

The reaction media of step one was heated to 40-50° C. until all the precipitated solids were dissolved. Next, 15.14 g of the ester that was obtained in step 1 was reacted with isophorone diisocyanate (IPDI, density 1.062, molecular weight 222) separately. Under nitrogen protection, 0.555 g (0.523 ml) of IPDI (2.5 mmol) and 50 ml toluene were charged into one part of the reaction media of Step 1 in a 500 ml three-neck flask under agitation. Thereafter, 0.042 g (0.04 ml) of DBTDL (18% metal in DBTDL, density 1.05 g/ml, 0.05% metal on total resin) was also charged using a syringe. Gradually the temperature was increased to 70° C. and maintained at such temperature for 8 hours. The reaction products were then cooled down.

Step 3: End Caps of Isocyanate-Terminated Polyester-Poly(Ethylene-Glycol) with Decaethylene Glycol Mono-Dodecyl Ether

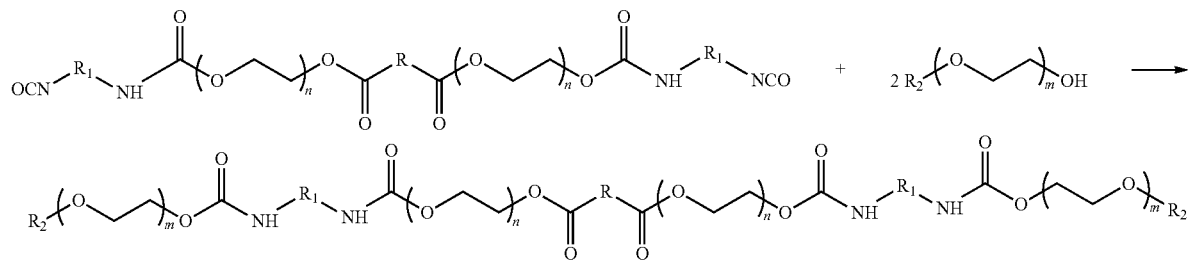

Next, 1.628 g of decaethylene glycol monododecyl ether (2.6 mmol, 4% extra) and 50 ml of toluene were charged to a 250 ml flask. The potential residual water in decaethylene glycol mono-dodecyl ether was removed by azeotropic distillation. The decaethylene glycol mono-dodecyl ether/toluene solution mixture was cooled. The mixture was then charged into the reaction media of step 2 under agitation, rinsed with 5 ml of toluene and charged into the reaction media again. The temperature was gradually increased to 70° C. A sample from the reaction mixture was characterized using FTIR until no isocyanate group absorption peak existed. Toluene was extracted from the media by rotary evaporation. Water was added to make a 25% polymeric dispersant aqueous solution.

Using the same general procedure, various other polymers suitable for use as the polymer of the inventive titanium dioxide pigment were synthesized using various dicarboxylic acids and hydrophobic end groups as per Table 1.

Example III

Comparative Testing of HEUR Resins

A number of existing, commercially available hydrophobically modified, ethoxylated urethane ("HEUR") resins, known to be useful as associative thickeners, were tested to determine if they could be effectively utilized as an anti-agglomeration polymer of a titanium dioxide pigment. The HEUR resins that were tested are shown in TABLE 2 below:

TABLE 2

| Sample HEUR Resins | |
|---|---|
| Product | Producer |
| Acrysol RM 825 | Dow Chemical |
| Acrysol RM 2020 | Dow Chemical |
| Bermodol PUR 2130 | Akzo Nobel |
| Bermodol PUR 2150 | Akzo Nobel |
| Borchi Gel 075 | OMG |
| Borchi Gel 0434 | OMG |
| BYK-425 | BYK |
| BYK-428 | BYK |
| DSX 1514 | BASF |
| DSX 3291 | BASF |
| DSX 3515 | BASF |
| K-Stay 730 | King Industries |
| K-Stay 731 | King Industries |

TABLE 2-continued

| Sample HEUR Resins | |
|---|---|
| Product | Producer |
| K-Stay -740 | King Industries |
| Rheolate 644 | Elementis |
| Rheolate 655 | Elementis |

The titanium dioxide pigment utilized in the tests described in this example (including the standard pigment) was a commercially available rutile titanium dioxide manufactured by Tronox LLC in accordance with the chloride process and sold in association with the trade designation CR-826.

Both dry and slurry samples of a titanium dioxide pigment were prepared by adding various amounts of 0.1-0.5% (by weight of $TiO_2$) to the above HEUR polymers. The samples were tested by measuring the tint strength (opacifying ability) of the samples. The tint strength of each sample was determined as relative tint strength of the pigment in a water-borne acrylic latex paint. In each test, the test pigment was compared to a standard pigment to determine the relative tint strength of the pigment.

In each test, the test sample and corresponding standard pigment were each incorporated in a separate portion of a freshly prepared acrylic, latex vehicle at a pigment volume concentration (PVC) of 22.0%. A paint film from each portion was then applied, side-by-side, on a Leneta card. The gloss of the dried films was measured from reflected light at a 60° angle using a gloss meter. Dry film tint strength was determined as relative tint strength and was calculated from the Y values, and tint tone was determined from the b* values measured with an integrating sphere spectrophotometer. A typical composition of the paint made from acrylic latex resin is given below.

22% PVC Exterior Gloss Acrylic

| | Lbs | Gals |
|---|---|---|
| Solvent | 50.08 | 5.77 |
| Dispersant | 10.01 | 1.18 |
| Wetting Agent | 5.26 | 0.63 |
| Defoamer | 0.98 | 0.14 |
| Water | 12.02 | 1.19 |
| TiO2 | 250.38 | 7.30 |
| Water | 28.17 | 3.57 |

-continued

|  | Lbs | Gals |
| --- | --- | --- |
| Water | 40.89 | 4.90 |
| Acrylic Latex Resin | 544.47 | 62.12 |
| Biocide | 0.97 | 0.11 |
| Defoamer | 0.97 | 0.14 |
| Coalescent | 18.32 | 2.31 |
| Water | 42.25 | 5.07 |
| Thickener | 45.32 | 5.43 |
| pH Adjustment | 1.03 | 0.14 |
|  | 1051.10 | 100.00 |

TABLE 2A

Pigment Tint Strength in Paint Formulation when made with commercially available HEUR polymers

| Product | Tint Strength |
| --- | --- |
| CR-826 Control | 106 |
| Acrysol RM 825 | 103 |
| Acrysol RM 2020 | 105 |
| Bermodol PUR 2130 | 106 |
| Bermodol PUR 2150 | 104 |
| Borchi Gel 075 | 107 |
| Borchi Gel 0434 | 105 |
| BYK -425 | 103 |
| BYK-428 | 103 |
| DSX 1514 | 107 |
| DSX 3291 | 108 |
| DSX 3515 | 104 |
| K-Stay 730 | 102 |
| K-Stay 731 | 105 |
| K-Stay -740 | 104 |
| Rheolate 644 | 104 |
| Rheolate 655 | 106 |

As shown by the results, none of the HEUR resins was effective in increasing the tint strength of the titanium dioxide pigments.

Tests of Inventive Titanium Dioxide Pigment

The titanium dioxide pigment utilized in the tests described in EXAMPLES IV-VII below (including the standard pigment) was a commercially available rutile titanium dioxide manufactured by Tronox LLC in accordance with the chloride process and sold in association with the trade designation CR-826.

Example IV

Preparation of Test Samples

First, an alumina treated titanium dioxide that did not contain the anti-agglomeration polymer of the inventive titanium dioxide pigment (Comparative Test Sample 4) was prepared.

Approximately 1500 grams of raw titanium dioxide pigment were dispersed in water in the presence of 0.10% by weight (based on the weight of the pigment) of sodium hexametaphosphate dispersant, along with a sufficient amount of sodium hydroxide to adjust the pH of the slurry to a value of 9.5 or greater. This resulted in the formation of an aqueous slurry containing approximately 35% by weight, based on the total weight of the slurry, of titanium dioxide particles.

The pigment slurry was then sand milled using zircon sand at a zircon sand-to-pigment weight ratio of 4:1, until a volume average particle size was achieved wherein more than 90% of the particles were smaller than 0.63 microns as determined utilizing a Microtrac X100 Particle Size Analyzer (Microtrac Inc., Montgomeryville, Pa.).

Next, the slurry was diluted to have a titanium dioxide concentration of approximately 30% by weight, based on the total weight of the slurry, and heated to 75° C. The slurry was then treated with 3.0% by weight, calculated as silica by weight of final pigment, of sodium silicate by adding the sodium silicate over 20 minutes as a 250 gram/liter aqueous sodium silicate solution ($SiO_2:Na_2O=3.5$). While maintaining the temperature at 75° C., the pH of the slurry was slowly decreased to pH=5.5 over a 55 minute period via the slow addition of 36% by weight aqueous sulfuric acid solution. Following a digestion period of 15 minutes at pH=7, 2.0% alumina, by weight of final pigment, was added over 20 minutes as a 180 gram/liter aqueous sodium aluminate solution, while maintaining the pH of the slurry between a value of 7 and 8.0 via the concomitant addition of 36% aqueous sulfuric acid solution.

The dispersion was allowed to equilibrate at 75° C. for 15 minutes, at which point the pH of the slurry was re-adjusted to 5.5, as necessary. At this point, the slurry was filtered while it was still hot. The resulting filter cake was washed with an amount of water, which had been preheated to 60° C., equal to 1.5 times the estimated weight of recovered pigment.

The washed semi-solid filter cake was subsequently re-dispersed in water with agitation and dried using an APV Nordic PSD52 Spray Dryer (Invensys APV Silkeborg, Denmark), maintaining a dryer inlet temperature of approximately 280° C., to yield a dry pigment powder. The dry pigment powder was then steam micronized in the presence of 0.35% by weight, based on the total weight of the pigment, of trimethylolpropane, utilizing a steam to pigment weight ratio of 1.8, with a steam injector pressure set at 146 psi and micronizer ring pressure set at 118 psi.

By the above steps, a dry treated titanium dioxide pigment (Comparative Test Sample 4) having a dense silica coating and an alumina coating deposited thereon in two sequential wet treatment steps was manufactured. The amount of the alumina deposited on the pigment in the wet treatment step was 2.0% by weight, based on the total weight of the pigment. The amount of the silica deposited on the pigment in the wet treatment step was 3.0% by weight, based on the total weight of the pigment.

Next, a first sample of the inventive titanium dioxide pigment (Inventive Test Sample 4A) was prepared utilizing the same procedure described above, except that the anti-agglomeration polymer was added to the pigment following the steam micronization step. The anti-agglomeration polymer used was polyethyleneglycol based adipate with heptaethyleneglycol dodecyl ether as end groups, which is Polymer #3 in TABLE 1 above. This polymer comprises approximately 60% by weight of a polyether based repeating unit, 35% by weight of a polyester based repeating unit and 5% by weight of hydrophobic end groups, based on the total weight of the polymer. The polymer has a molecular weight of approximately 1200.

The anti-agglomeration polymer was added to the treated pigment in an amount of 0.1% by weight, based on the weight of the titanium dioxide in the sample.

A second sample of the inventive titanium dioxide pigment (Inventive Test Sample 4B) was then prepared utilizing the same pigment, polymer and procedure described above in connection with the first sample of the inventive titanium dioxide pigment, except in this sample, prior to adding the polymer to the pigment, a non-ionic surfactant was added to the drier feed prior to drying but after washing the titanium dioxide particles. The non-ionic surfactant utilized was ECO-SURF™ LF-45 (a non-ionic secondary alcohol alkoxylate surfactant sold by The Dow Chemical Company). This surfactant had a hydrophilic-lipophilic balance (HLB) value of 13. The non-ionic surfactant was added to the pigment in an amount of 0.2% by weight, based on the weight of the titanium dioxide particles.

Measurement of Tint Strength

Comparative Test Sample 4 and Inventive Test Samples 4A and 4B, each a dry pigment sample, were then tested by measuring the tint strength (opacifying ability) of the samples. The tint strength of each sample was determined as relative tint strength of the pigment in a water-borne acrylic latex paint. In each test, the test pigment was compared to a standard pigment to determine the relative tint strength of the pigment.

In each test, the test sample and corresponding standard pigment were each incorporated in a separate portion of a freshly prepared acrylic, latex vehicle at a pigment volume concentration (PVC) of 22.0%. A paint film from each portion was then applied, side-by-side, on a Leneta card. The gloss of the dried films was measured from reflected light at a 60° angle using a gloss meter. Dry film tint strength was determined as relative tint strength and was calculated from the Y values, and tint tone was determined from the b* values measured with an integrating sphere spectrophotometer. A typical composition of the paint made from acrylic latex resin is given below.

22% PVC Exterior Gloss Acrylic

|  | Lbs | Gals |
| --- | --- | --- |
| Solvent | 50.08 | 5.77 |
| Dispersant | 10.01 | 1.18 |
| Wetting Agent | 5.26 | 0.63 |
| Defoamer | 0.98 | 0.14 |
| Water | 12.02 | 1.19 |
| TiO2 | 250.38 | 7.30 |
| Water | 28.17 | 3.57 |
| Water | 40.89 | 4.90 |
| Acrylic Latex Resin | 544.47 | 62.12 |
| Biocide | 0.97 | 0.11 |
| Defoamer | 0.97 | 0.14 |
| Coalescent | 18.32 | 2.31 |
| Water | 42.25 | 5.07 |
| Thickener | 45.32 | 5.43 |
| pH Adjustment | 1.03 | 0.14 |
|  | 1051.10 | 100.00 |

The results of the tests are shown by TABLE 3 below:

TABLE 3

Pigment Tint Strength in Paint Formulation (Pigment in Dry Form)

| Pigment Sample | Tint Strength* |
| --- | --- |
| Comparative Test Sample 4 | 107 |
| Inventive Test Sample 4A | 114 |
| Inventive Test Sample 4B | 118 |

*relative tinting strength, or tint strength, determined in a 22 PVC water-borne acrylic latex paint TABLE 3 illustrates that the inventive titanium dioxide pigment exhibits a substantial increase in tint strength as compared to the same pigment without the anti-agglomeration polymer. TABLE 3 also shows that depositing a non-ionic surfactant on the titanium dioxide particles increases the tint strength of the pigment to an even higher level.

Example V

In this example, the same tint strength tests were repeated on the same comparative treated titanium dioxide pigment (Comparative Test Sample 4) and samples of the inventive titanium dioxide pigment (Inventive Test Samples 4A and 4B) tested in EXAMPLE III, except in these tests the pigment samples (Comparative Test Sample 5 and Inventive Test Samples 5A and 5B) were tested in slurry form as opposed to dry form.

The test samples were prepared using the same components and in the same manner as set forth in EXAMPLE III. Similarly, the tint strength tests were carried out using the same procedure set forth in EXAMPLE III. However, prior to adding the pigment samples (and standard pigment samples) to the paint formulations, the samples were incorporated into aqueous slurries. The aqueous pigment slurries were then added to the paint formulations.

Each test slurry was prepared by first adding the anti-agglomeration polymer to the water. Next, the titanium dioxide pigment and then a polyelectrolyte dispersant were added to the slurry. The slurry was ground at high speed for 10 minutes. The amount of the pigment in each slurry was approximately 77% by weight, based on the total weight of the slurry.

The results of the tests are shown in TABLE 4 below:

TABLE 4

Pigment Tint Strength in Paint Formulation (Pigment in Slurry Form)

| Pigment Sample | Tint Strength* |
| --- | --- |
| Comparative Test Sample 5 | 106 |
| Inventive Test Sample 5A | 115 |
| Inventive Test Sample 5B | 119 |

*relative tinting strength, or tint strength, determined in a 22 PVC water-borne acrylic latex paint As shown by TABLE 4, the same results were achieved by the inventive titanium dioxide pigment even though the pigment was added to the paint formulation in slurry form.

Example VI

In this example, the same titanium dioxide pigment test samples prepared in accordance with EXAMPLE III were prepared, except in these samples, the anti-agglomeration polymer utilized was a polyethyleneglycol based adipate with dodecaethyleneglycol dodecyl ether as end groups instead of a polyethyleneglycol based adipate with heptaethylene glycol dodecyl ether as end groups. The polyethyleneglycol based adipate with dodecaethyleneglycol dodecyl ether as end groups is Polymer #6 in TABLE 1 above. This polymer comprises approximately 65% by weight of a polyether based repeating unit, 30% by weight of a polyester based repeating unit and 5% by weight of hydrophobic end groups, based on the total weight of the polymer. The polymer has a molecular weight of approximately 15,000.

The non-ionic surfactant used to form Inventive Test Sample 3B was also used to prepare the corresponding test sample in this example; however, in this example, the non-ionic surfactant was added together with the anti-agglomeration polymer during the post micronization step.

The same tint strength tests carried out on the comparative treated titanium dioxide pigment (Comparative Test Sample 4) and samples of the inventive titanium dioxide pigment (Inventive Test Samples 4A and 4B) in EXAMPLE III were then carried out on these test samples (Comparative Test Sample 6 and Inventive Test Samples 6A and 6B). The results of the tests are set forth below:

TABLE 5

Pigment Tint Strength in Paint Formulation (Pigment in Dry Form)

| Pigment Sample | Tint Strength* |
|---|---|
| Comparative Test Sample 6 | 106 |
| Inventive Test Sample 6A | 115 |
| Inventive Test Sample 6B | 120 |

*relative tinting strength, or tint strength, determined in a 22 PVC water-borne acrylic latex paint TABLE 5 illustrates that the inventive titanium dioxide pigment exhibits a substantial increase in tint strength as compared to the same pigment without the anti-agglomeration polymer. TABLE 5 also shows that depositing a non-ionic surfactant on the titanium dioxide particles increases the tint strength of the pigment to an even higher level.

Example VII

In this example, the same tint strength tests were repeated on the same comparative treated titanium dioxide pigment (Comparative Test Sample 6) and samples of the inventive titanium dioxide pigment (Inventive Test Samples 6A and 6B) tested in EXAMPLE V, except in these tests the pigment samples (Comparative Test Sample 7 and Inventive Test Samples 7A and 7B) were tested in slurry form as opposed to dry form.

The test samples were prepared using the same components and in the same manner as set forth in EXAMPLE V. Similarly, the tint strength tests were carried out using the same procedure set forth in EXAMPLE V. However, prior to adding the pigment samples (and standard pigment samples) to the paint formulations, the samples were incorporated into aqueous slurries. The aqueous pigment slurries were then added to the paint formulations.

Each test slurry was prepared by first adding the non-ionic surfactant and anti-agglomeration polymer to the water. Next, the titanium dioxide pigment and then a sodium hexametaphosphate dispersant were added to the slurry. The slurry was ground at high speed for 10 minutes. The amount of the pigment in each slurry was approximately 77% by weight, based on the total weight of the slurry.

The results of the tests are shown in TABLE 6 below:

TABLE 6

Pigment Tint Strength in Paint Formulation (Pigment in Slurry Form)

| Pigment Sample | Tint Strength* |
|---|---|
| Comparative Test Sample 7 | 106 |
| Inventive Test Sample 7A | 117 |
| Inventive Test Sample 7B | 121 |

*relative tinting strength, or tint strength, determined in a 22 PVC water-borne acrylic latex paint As shown by TABLE 6, the same results were achieved by the inventive titanium dioxide pigment formed using the anti-agglomeration polymer described in EXAMPLE V even though the pigment was added to the paint formulation in slurry form.

Example VIII

Preparation of Test Samples

The titanium dioxide pigment utilized in this example (including the standard pigment) was a commercially available rutile titanium dioxide manufactured by Tronox LLC in accordance with the chloride process and sold in association with the trade designation CR-828.

First, an alumina treated titanium dioxide that did not contain the anti-agglomeration polymer of the inventive titanium dioxide pigment (Comparative Test Sample 3) was prepared.

Approximately 1500 grams of raw titanium dioxide pigment were dispersed in water in the presence of 0.1% by weight (based on the weight of the pigment) of sodium hexametaphosphate dispersant, along with a sufficient amount of sodium hydroxide to adjust the pH of the slurry to a minimum value of 9.5. This resulted in the formation of an aqueous slurry containing approximately 35% by weight, based on the total weight of the slurry, of titanium dioxide particles.

The pigment slurry was then sand milled using zircon sand at a zircon sand-to-pigment weight ratio of 4:1, until a volume average particle size was achieved wherein more than 90% of the particles were smaller than 0.63 microns as determined utilizing a Microtrac X100 Particle Size Analyzer (Microtrac Inc., Montgomeryville, Pa.).

The slurry was then heated to 70° C., acidified to a pH of about 4-5.0 using concentrated sulfuric acid, then treated with zirconia. The total amount of zirconia added to the slurry was 0.25% by weight, based on the weight of the titanium dioxide in the slurry. The zirconia was added rapidly as a 200 gram/liter aqueous zirconium oxychloride solution, over a five minute period.

After the addition of the zirconium oxychloride, the slurry was maintained at 70° C., adjusted to a pH of 8.0 using a sodium aluminate solution, and then treated with alumina. The total amount of alumina added to the slurry was 2.8% by weight, based on the weight of the titanium dioxide in the slurry. The alumina was added as a 357 gram/liter aqueous sodium aluminate solution over a fifteen minute period. During the addition of the sodium aluminate solution, the pH of the slurry was maintained between a value of 8.0 and 8.5 via the addition of sulfuric acid. After the addition of the sodium aluminate solution, the slurry was allowed to digest for 15 minutes at 70° C.

The dispersion was then filtered while hot. The resulting filtrate was washed with an amount of water, which had been preheated to 60°. The washed semi-solid filter cake was dried using an APV Nordic PSD52 Spray Dryer (Invensys APV, Silkeborg, Denmark), maintaining a dryer inlet temperature of approximately 280° C., to yield a dry pigment powder. The dry pigment powder was then steam micronized in the presence of 0.35% by weight, based on the weight of the titanium dioxide, of trimethylolpropane, utilizing a steam to pigment weight ratio of 1.8, with a steam injector pressure set at 146 psi and micronizer ring pressure set at 118 psi.

By the above steps, a dry treated titanium dioxide pigment (Comparative Test Sample 7) having a zirconia coating and an alumina coating deposited thereon in two sequential wet treatment steps was manufactured. The amount of the zirconia deposited on the pigment in the wet treatment step was 0.25% by weight, based on the total weight of the pigment.

The amount of the alumina deposited on the pigment in the wet treatment step was 2.8% by weight, based on the total weight of the pigment.

Next, a first sample of the inventive titanium dioxide pigment (Inventive Test Sample 8A) was prepared utilizing the same procedure described above, except that the anti-agglomeration polymer was added to the pigment following the steam micronization step. The anti-agglomeration polymer used was polyethyleneglycol based adipate with heptaethyleneglycol dodecyl ether as end groups, which is Polymer #3 in TABLE 1 above. This polymer comprises approximately 60% by weight of a polyether based repeating unit, 35% by weight of a polyester based repeating unit and 5% by weight of hydrophobic end groups, based on the total weight of the polymer. The polymer has a molecular weight of approximately 12,000.

The anti-agglomeration polymer was added to the treated pigment in an amount of 0.1% by weight, based on the weight of the titanium dioxide in the sample.

A second sample of the inventive titanium dioxide pigment (Inventive Test Sample 8B) was then prepared utilizing the same pigment, polymer and procedure described above in connection with the first sample of the inventive titanium dioxide pigment, except in this sample, prior to adding the polymer to the pigment, a non-ionic surfactant was added to the drier feed (after washing but before drying) of the titanium dioxide particles. The non-ionic surfactant utilized was ENVIROGEM® 2010 (a multifunctional surfactant sold by Air Products and Chemicals, Inc.). The surfactant had a hydrophilic-lipophilic balance (HLB) value of 13. The non-ionic surfactant was added to the pigment in an amount of 0.2% by weight, based on the weight of the titanium dioxide particles in the sample.

Measurement of Tint Strength

Comparative Test Sample 8 and Inventive Test Samples 8A and 8B, each a dry pigment sample, were then tested by measuring the tint strength (opacifying ability) of the samples. The tint strength of each sample was determined as relative tint strength of the pigment in a water-borne acrylic latex paint. In each test, the test pigment was compared to a standard pigment to determine the relative tint strength of the pigment.

In each test, the test sample and corresponding standard pigment were each incorporated in a separate portion of a freshly prepared acrylic, latex vehicle at a pigment volume concentration (PVC) of 22.0%. A paint film from each portion was then applied, side-by-side, on a Leneta card. The gloss of the dried films was measured from reflected light at a 60° angle using a gloss meter. Dry film tint strength was determined as relative tint strength and was calculated from the Y values, and tint tone was determined from the b* values measured with an integrating sphere spectrophotometer.

A typical composition of the paint made from acrylic latex resin is given below.

22% PVC Exterior Gloss Acrylic

|  | Lbs | Gals |
| --- | --- | --- |
| Solvent | 50.08 | 5.77 |
| Dispersant | 10.01 | 1.18 |
| Wetting Agent | 5.26 | 0.63 |
| Defoamer | 0.98 | 0.14 |

-continued

|  | Lbs | Gals |
| --- | --- | --- |
| Water | 12.02 | 1.19 |
| TiO2 | 250.38 | 7.30 |
| Water | 28.17 | 2.57 |
| Water | 40.89 | 4.90 |
| Acrylic Latex Resin | 544.47 | 62.12 |
| Biocide | 0.97 | 0.11 |
| Defoamer | 0.97 | 0.14 |
| Coalescent | 18.32 | 2.31 |
| Water | 42.25 | 5.07 |
| Thickener | 45.32 | 5.43 |
| pH Adjustment | 1.03 | 0.14 |
|  | 1051.10 | 100.00 |

The results of the tests are shown by TABLE 7 below:

TABLE 7

Pigment Tint Strength in Paint Formulation (Pigment in Dry Form)

| Pigment Sample | Tint Strength* |
| --- | --- |
| Comparative Test Sample 8 | 107 |
| Inventive Test Sample 8A | 123 |
| Inventive Test Sample 8B | 125 |

*relative tinting strength, or tint strength, determined in a 22 PVC water-borne acrylic latex paint TABLE 7 illustrates that the inventive titanium dioxide pigment exhibits a substantial increase in tint strength as compared to the same pigment without the anti-agglomeration polymer. TABLE 7 also shows that depositing a non-ionic surfactant on the titanium dioxide particles increases the tint strength of the pigment to an even higher level.

Example IX

The titanium dioxide pigment utilized in the tests described in this example was a commercially available rutile titanium dioxide manufactured by Tronox LLC in accordance with the chloride process and sold in association with the trade designation CR-813.

Preparation of Test Samples

First, an alumina treated titanium dioxide that did not contain the anti-agglomeration polymer of the inventive titanium dioxide pigment (Comparative Test Sample 9) was prepared.

Approximately 1500 grams of raw titanium dioxide pigment were dispersed in water in the presence of 0.15% by weight (based on the weight of the pigment) of sodium hexametaphosphate dispersant, along with a sufficient amount of sodium hydroxide to adjust the pH of the slurry to a value of 9.5 or greater. This resulted in the formation of an aqueous slurry containing approximately 35% by weight, based on the total weight of the slurry, of titanium dioxide particles.

The pigment slurry was then sand milled using zircon sand at a zircon sand-to-pigment weight ratio of 4:1, until a volume average particle size was achieved wherein more than 70% of the particles were smaller than 0.63 microns as determined utilizing a Microtrac X100 Particle Size Analyzer (Microtrac Inc., Montgomeryville, Pa.).

The slurry was then heated to 70° C. The pH of the slurry was adjusted to 1.5 and the slurry was allowed to digest for 15 minutes in order to create anchoring sites on the pigment particles to assist in the formation of hydrous metal oxide coatings thereon.

After the aqueous slurry was allowed to digest for 15 minutes, 400 ml of sodium silicate were added to the aqueous slurry which caused a coating of silica particles to precipitate on the base pigment particles. The pH was then increased to 4.5 and maintained at this level.

Thereafter, the pH of the aqueous slurry was increased to 11 by adding 90 ml of sodium aluminate. The pH of the slurry was then adjusted to less than 5 and the slurry was allowed to digest for an additional 15 minutes in order to allow the pH of the slurry to stabilize.

The slurry was then filtered to recover the coated pigment therefrom, and the coated pigment was washed to remove soluble salts therefrom. The resulting filter cake was dried in an oven. The dry pigment powder was then steam micronized in the presence of 0.15% by weight, based on the weight of the pigment, of trimethylolpropane, utilizing a steam to pigment weight ratio of 1:5, with a steam injector pressure set at 146 psi and micronizer ring pressure set at 118 psi, completing the finished pigment preparation.

By the above steps, a dry treated titanium dioxide pigment (Comparative Test Sample 9) having a fluffy silica coating and an alumina coating deposited thereon in two sequential wet treatment steps was manufactured. The amount of the silica deposited on the pigment in the wet treatment step was 8% by weight, based on the total weight of the pigment. The amount of the alumina deposited on the pigment in the wet treatment step was 4% by weight, based on the total weight of the pigment.

Next, a sample of the inventive titanium dioxide pigment (Inventive Test Sample 9A) was prepared utilizing the same procedure described above, except that the anti-agglomeration polymer was added to the pigment following the steam micronization step. The anti-agglomeration polymer used was polyethyleneglycol based adipate with heptaethyleneglycol dodecyl ether as end groups, which is Polymer #3 in TABLE 1 above. This polymer comprises approximately 60% by weight of a polyether based repeating unit, 35% by weight of a polyester based repeating unit and 5% by weight of hydrophobic end groups, based on the total weight of the polymer. The polymer has a molecular weight of approximately 12,000.

The anti-agglomeration polymer was added to the treated pigment in an amount of 0.1% by weight, based on the weight of the titanium dioxide in the sample.

Measurement of Tint Strength and Tint Tone

Tint strength and tint tone were measured using a 60% PVC (pigment volume concentration) latex emulsion formulation (flat) tinted with carbon black. The PVC of the paint was above the CPVC (critical pigment volume concentration) for this system. A sample and a standard pigment were prepared in identical formulations.

Both paints were then drawn down side-by-side on a Leneta card. The CIE L* and b* values of the dried paints were measured using an integrating sphere spectrophotometer and these values used to calculate the tint strength and tint tone.

Tint strength was calculated using the Kubelka Munk Equation where:

$$\text{Tint Strength} = \frac{\left(\frac{K}{S}\right)_{Standard}}{\left(\frac{K}{S}\right)_{Sample}} \times AssignedValue$$

where: K=Absorbance of carbon black pigment
S=Scatter of titanium dioxide pigment
Tint Tone was calculated as follows:

$$\text{Tint Tone} = b_{Sample}^* - b_{Standard}^* + AssignedValue;$$

The composition of the paint is shown below:

60% PVC Flat Latex

|  | Lbs | Gals |
| --- | --- | --- |
| Water | 100.0 | 12.00 |
| Thickener | 100.0 | 12.00 |
| Fluidizing Agent | 1.5 | 0.15 |
| Dispersant | 7.0 | 0.75 |
| Wetting Agent | 2.0 | 0.25 |
| Solvent | 23.0 | 2.50 |
| Defoamer | 1.0 | 0.12 |
| Biocide | 1.5 | 0.15 |
| TiO$_2$ | 150.0 | 4.69 |
| China Clay | 75.0 | 3.42 |
| Kaolin Clay | 75.0 | 3.49 |
| Cal-White | 150.0 | 6.67 |
| Coalescent | 6.0 | 0.76 |
| Water | 100.0 | 12.00 |
| Thickener | 133.0 | 15.97 |
| Defoamer | 1.0 | 0.12 |
| Vinyl Acrylic Latex | 226.0 | 25.00 |
| Total | 1152.0 | 100.04 |

Ink stain was measured using an untinted drawdown of the same paint used in the tint strength test. The CIE L* of the dried film was measured using a integrating sphere spectrophotometer. A 1.0 mil drawdown of ink was applied to the paint film and allowed to penetrate for 2 minutes. The ink was then removed by vigorous rubbing with a naphtha based solvent and the CIE L* value again read.

The ink stain value was then calculated as follows:

$$\text{InkStain} = L_{beforeInk}^* - L_{afterInk}^*;$$

Oil absorption was measured using a spatula rub-out method similar to ASTM D281-95. The only deviation from the ASTM method was the use of 5 grams of pigment in both the test and the calculations so that the result is still reported as grams of oil required to wet 100 grams of pigment.

The test data is provided in TABLE 8, together with comparative results from two finished pigment samples. The first sample was prepared utilizing the same procedure described above. The inventive test sample was prepared by adding 0.1% of the anti-agglomeration polymer (#3 from the TABLE 1) (by weight of TiO$_2$) at the post micronization step. No surfactant was added in this example.

TABLE 8

Titanium Dioxide Base Pigment with Silica and Alumina Coatings

|  | pH | Specific Resistance | Tint Strength | Tint Tone | Ink Stain | Oil Absorption | BET Surface Area (m$^2$/g) |
| --- | --- | --- | --- | --- | --- | --- | --- |
| Comparative Test Sample 9A | 9.0 | 9,990 | 109 | −3.74 | −8.3 | 46 | 36 |
| Inventive Test Sample 9A | 8.9 | 9,270 | 127 | −3.82 | −8.4 | 44 | 40 |

TABLE 8 illustrates that the inventive titanium dioxide pigment exhibits a substantial increase in tint strength as compared to the same pigment without the anti-agglomeration polymer. TABLE 8 also shows the anti-agglomerating polymer works well with flat grade pigment similar to enamel grade pigment.

Thus, the present invention is well adapted to carry out the objects and attain the ends and advantages mentioned as well as those which are inherent therein.

What is claimed is:

1. A titanium dioxide pigment, comprising:
a plurality of titanium dioxide particles, said particles having anchoring moieties associated therewith for facilitating anchoring of a polymer to said particles; and
a polymer deposited on said titanium dioxide particles for inhibiting agglomeration of said titanium dioxide particles in an aqueous based coating formulation, wherein said coating formulation includes an aqueous based solvent and a resin, and wherein said polymer is a copolymer having anchoring groups for attaching to said anchoring moieties associated with said titanium dioxide particles, and hydrophobic end groups for interacting with particles of said resin of said coating formulation to form a network between said titanium dioxide particles and said resin particles in said coating formulation.

2. The titanium dioxide pigment of claim 1, wherein said titanium dioxide particles are manufactured by either the sulfate process or the chloride process.

3. The titanium dioxide pigment of claim 1, wherein said titanium dioxide particles are rutile titanium dioxide particles manufactured by the chloride process.

4. The titanium dioxide pigment of claim 1, wherein said aqueous based coating formulation is an aqueous based paint formulation.

5. The titanium dioxide pigment of claim 1, wherein said anchoring moieties are selected from the group consisting of hydroxyl moieties, phosphate moieties and mixtures thereof.

6. The titanium dioxide pigment of claim 5, wherein said anchoring moieties are hydroxyl moieties.

7. The titanium dioxide pigment of claim 1, further comprising one or more hydrous metal oxide coatings deposited on said titanium dioxide particles.

8. The titanium dioxide pigment of claim 1, wherein said polymer has both hydrophobic moieties and hydrophilic moieties.

9. The titanium dioxide pigment of claim 8, wherein said polymer includes a polyether based repeating unit and a polyester based repeating unit, said polyether based repeating unit and said polyester based repeating unit being linked together.

10. The titanium dioxide pigment of claim 9, wherein said polyether based repeating unit is a polyol.

11. The titanium dioxide pigment of claim 10, wherein said polyol is selected from the group of polyethyleneglycol, trimethylolpropane, pentaerythritol, mannitol, and mixtures thereof.

12. The titanium dioxide pigment of claim 11, wherein said polyol is polyethyleneglycol.

13. The titanium dioxide pigment of claim 9, wherein said polyester based repeating unit is a hydroxyl terminated polyester.

14. The titanium dioxide pigment of claim 13, wherein said hydroxyl terminated polyester is formed by reacting a polyol with a dicarboxylic acid.

15. The titanium dioxide pigment of claim 14 wherein said polyol reacted with a dicarboxylic acid is polyethyleneglycol.

16. The titanium dioxide pigment of claim 15 wherein said dicarboxylic acid is selected from the group of glutaric acid, adipic acid, azelaic acid and mixtures thereof.

17. The titanium dioxide pigment of claim 9, wherein said polyether based repeating unit and said polyester based repeating unit are linked together by a urethane linkage.

18. The titanium dioxide pigment of claim 17, wherein said urethane linkage is a diisocyanate.

19. The titanium dioxide pigment of claim 18, wherein said urethane linkage is an aliphatic diisocyanate.

20. The titanium dioxide pigment of claim 19, wherein said aliphatic diisocyanate is isophorone diisocyanate.

21. The titanium dioxide pigment of claim 9, wherein said hydrophobic end groups have the general formula:

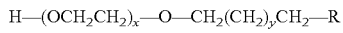

wherein:
$x=2$ to $20$;
$y=5$ to $10$; and
R is a hydrogen group or a phenyl group.

22. The titanium dioxide pigment of claim 21, wherein said hydrophobic end groups are oligomers of ethyleneglycol alkyl ethers.

23. The titanium dioxide pigment of claim 22, wherein said hydrophobic end groups are selected from heptaethyleneglycol dodecyl ether, dodecaethyleneglycol dodecyl ether, pentadecaethyleneglycol dodecyl ether and mixtures thereof.

24. The titanium dioxide pigment of claim 23, wherein said hydrophobic end groups are dodecaethyleneglycol dodecyl ether.

25. The titanium dioxide pigment of claim 9, wherein said polymer comprises in the range of from about 50% to about 80% by weight of said polyether based repeating unit, in the range of from about 5% to about 40% by weight of said polyester based repeating unit, and in the range of from about 0.5% to about 15% by weight of said hydrophobic end groups.

26. The titanium dioxide pigment of claim 1, wherein said polymer is a random copolymer of polyether based polyurethanes and polyester based polyurethanes having end groups that are oligomers of ethyleneglycol alkyl ethers.

27. The titanium dioxide pigment of claim 26, wherein said polymer is selected from the group of a polyethyleneglycol based adipate with heptaethyleneglycol dodecyl ether as end groups, a polyethyleneglycol based adipate with dodecaethyleneglycol dodecyl ether as end groups, and a polyethyleneglycol based azileate with pentadecaethyleneglycol dodecyl ether as end groups.

28. The titanium dioxide pigment of claim 27, wherein said polymer is a polyethyleneglycol based adipate with heptaethyleneglycol dodecyl ether as end groups.

29. The titanium dioxide pigment of claim 1 wherein said polymer has a molecular weight in the range of from about 10 kilodaltons to about 70 kilodaltons.

30. The titanium dioxide pigment of claim 1, further comprising a non-ionic surfactant deposited on said titanium dioxide particles for enhancing the propensity of said polymer to attach to said titanium dioxide particles.

31. The titanium dioxide pigment of claim 30, wherein said non-ionic surfactant is a hydrocarbon having in the range of from 10 to 20 carbon atoms.

32. The titanium dioxide pigment of claim 31, wherein said non-ionic surfactant is selected from the group of a) saturated aliphatic hydrocarbons, b) unsaturated aliphatic hydrocarbons having one or more double bonds, c) unsaturated aliphatic hydrocarbons having one or more ethoxylated hydrocarbon chains, and d) mixtures thereof.

33. The titanium dioxide pigment of claim 31, wherein said non-ionic surfactant includes one or more functional groups selected from the group of amines, amides, carboxylates, esters, hydroxyls, phosphates, silanes, sulfonates, and thiols.

34. The titanium dioxide pigment of claim 33, wherein said non-ionic surfactant has a hydrophilic-lipophilic balance of 10 to 18.

35. The titanium dioxide pigment of claim 30, wherein said non-ionic surfactant is deposited on said pigment in an amount in the range of from about 0.1 to about 5% by weight, based on the total weight of said pigment.

36. The titanium dioxide pigment of claim 17, wherein said aqueous based coating formulation is an aqueous based paint formulation.

* * * * *